(12) United States Patent
Majima

(10) Patent No.: US 6,425,371 B2
(45) Date of Patent: Jul. 30, 2002

(54) CONTROLLER FOR INTERNAL COMBUSTION ENGINE

(75) Inventor: Yoshihiro Majima, Inuyama (JP)

(73) Assignee: Denso Corporation, Kariya (JP)

( * ) Notice: Subject to any disclaimer, the term of this patent is extended or adjusted under 35 U.S.C. 154(b) by 79 days.

(21) Appl. No.: 09/725,479

(22) Filed: Nov. 30, 2000

(30) Foreign Application Priority Data

Dec. 2, 1999 (JP) ............................................. 11-343124

(51) Int. Cl.$^7$ ................................................ F02D 45/00
(52) U.S. Cl. ........................... 123/406.24; 123/406.22; 123/406.41; 123/435
(58) Field of Search ............................ 123/406.24, 435, 123/436, 406.11, 406.22, 406.26, 406.41; 701/102, 111

(56) References Cited

U.S. PATENT DOCUMENTS

| | | | | |
|---|---|---|---|---|
| 4,094,286 A | * | 6/1978 | Kuroda et al. ............ | 123/568.2 |
| 5,575,248 A | | 11/1996 | Tada ...................... | 123/184.56 |
| 5,682,866 A | * | 11/1997 | Shimizu et al. .............. | 123/674 |
| 6,055,956 A | * | 5/2000 | Nishimura et al. .......... | 123/299 |
| 6,116,208 A | * | 9/2000 | Nishimura et al. .......... | 123/295 |

FOREIGN PATENT DOCUMENTS

| | | | | |
|---|---|---|---|---|
| JP | 63-1763 | * | 1/1988 | ............ F02P/5/155 |
| JP | 2-245443 | * | 10/1990 | ............ F02D/41/16 |
| JP | 6-229297 | | 8/1994 | ............ F02D/41/16 |
| JP | 9-68080 | * | 3/1997 | ............ F02D/41/14 |
| JP | 2001-159367 | * | 6/2001 | ............ F02D/45/00 |

* cited by examiner

Primary Examiner—Henry C. Yuen
Assistant Examiner—Hieu T. Vo
(74) Attorney, Agent, or Firm—Nixon & Vanderhye P.C.

(57) ABSTRACT

A controller for an internal combustion engine is disclosed that improves drivability by always stabilizing combustion. A combustion state is detected based on an engine speed fluctuation every cylinder, and whether combustion is stable is determined. When combustion is stable, whether the condition of executing fuel stability deteriorating operation is satisfied is determined. When combustion is unstable or the condition of executing the fuel stability deteriorating operation is satisfied, a control item adapted to current operating state is selected from control items of ignition timing, ignition method, in-cylinder flow velocity, EGR rate, and air-fuel ratio, and a control is performed so that the combustion velocity and the combustion pressure are stabilized. In the ignition control method, a spark is made a plurality of times by a spark plug. In the control of the in-cylinder flow velocity, a gas flow velocity in a cylinder is increased by strengthening a swirl flow.

11 Claims, 23 Drawing Sheets

| ENGINE SPEED NE(rpm) | 500 | 1000 | 2000 | 3000 | 4000 |
|---|---|---|---|---|---|
| FIRST ALLOWABLE TORQUE FLUCTUATION TTA1 | 5 | 10 | 15 | 20 | 30 |
| SECOND ALLOWABLE TORQUE FLUCTUATION TTA2 | 5 | 10 | 15 | 20 | 25 |

| INTAKE AIR VOLUME GA(g/s) \ ENGINE SPEED NE(rpm) | 500 | 1000 | 2000 | 3000 | 4000 |
|---|---|---|---|---|---|
| 5 | 5 | 10 | 15 | 20 | 30 |
| 10 | 7 | 15 | 20 | 25 | 40 |

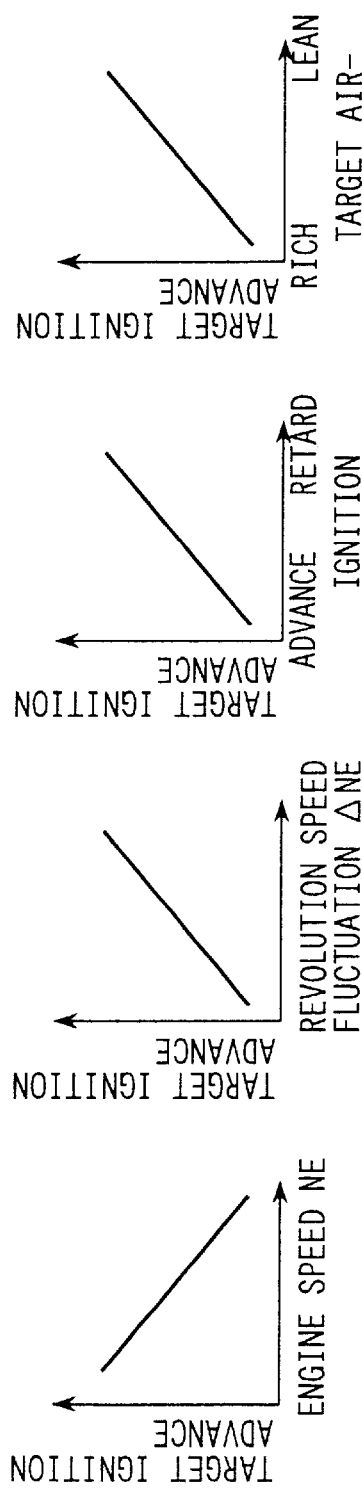
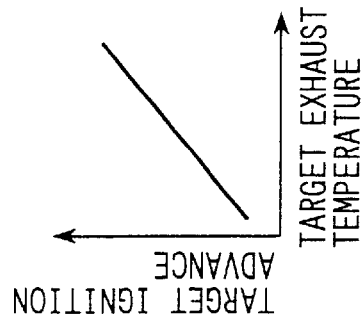
FIG. 10A FIG. 10B FIG. 10C FIG. 10D FIG. 10E

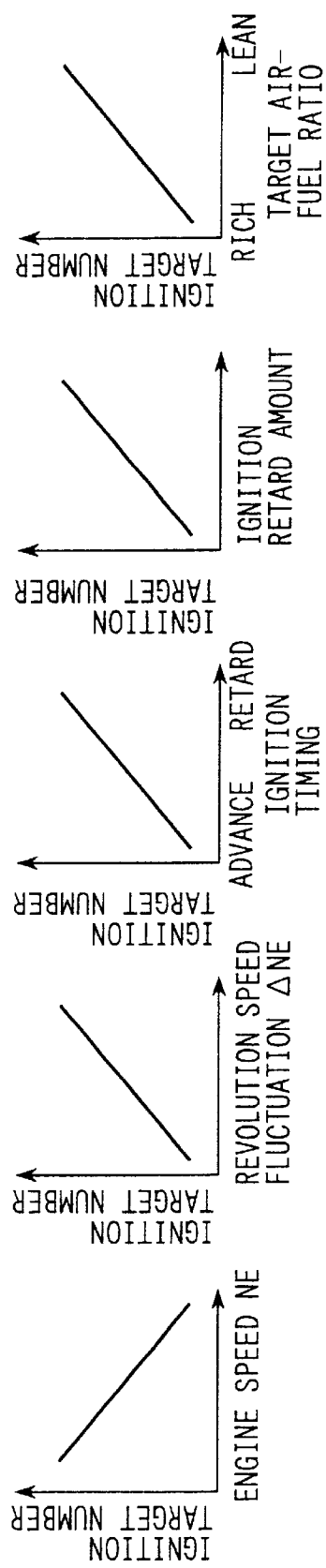
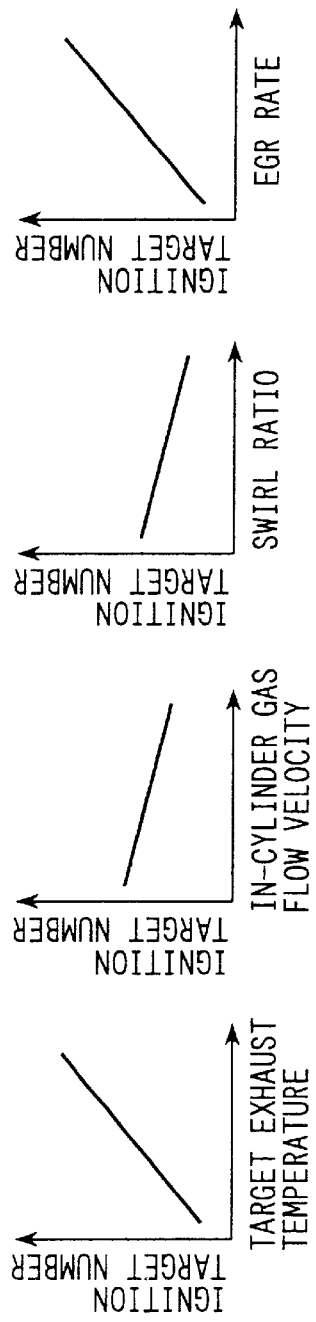
FIG. 12A  FIG. 12B  FIG. 12C  FIG. 12D  FIG. 12E
FIG. 12F  FIG. 12G  FIG. 12H  FIG. 12I

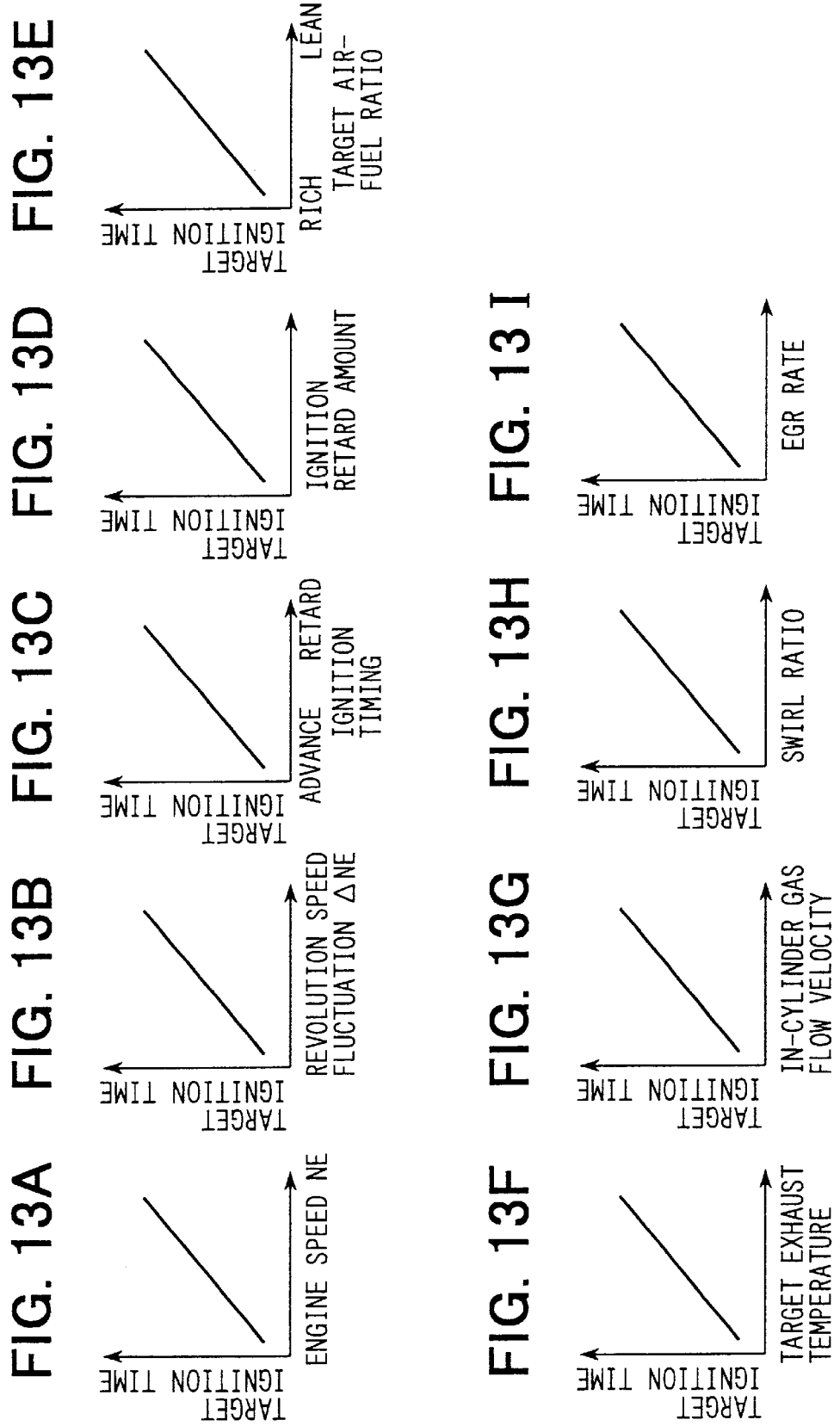

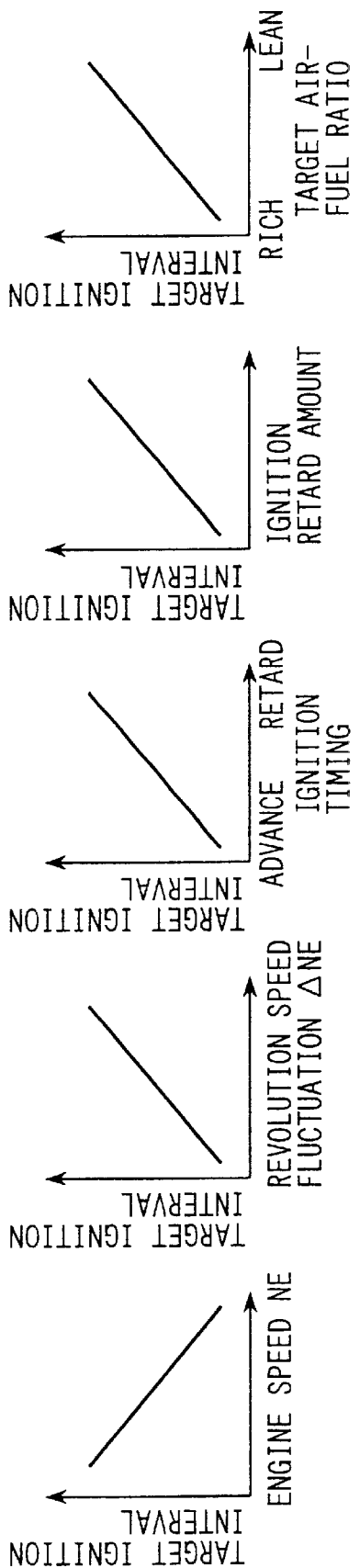
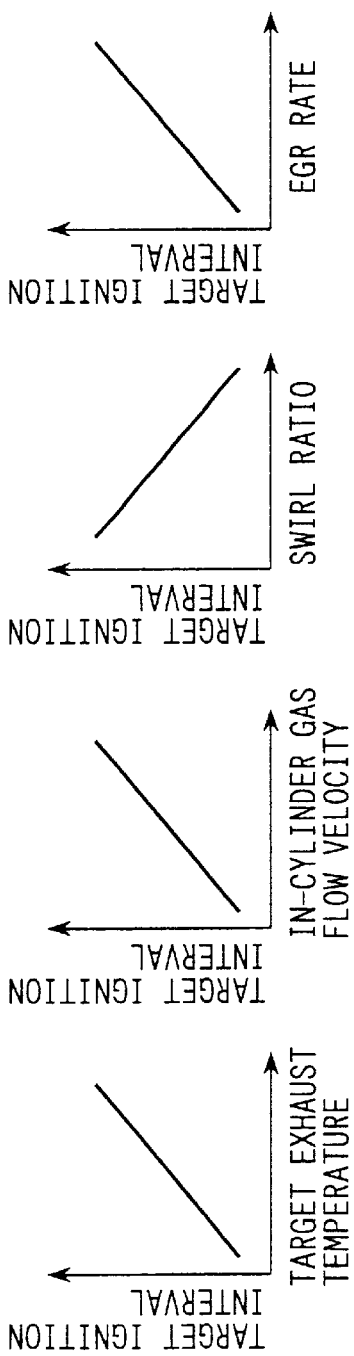

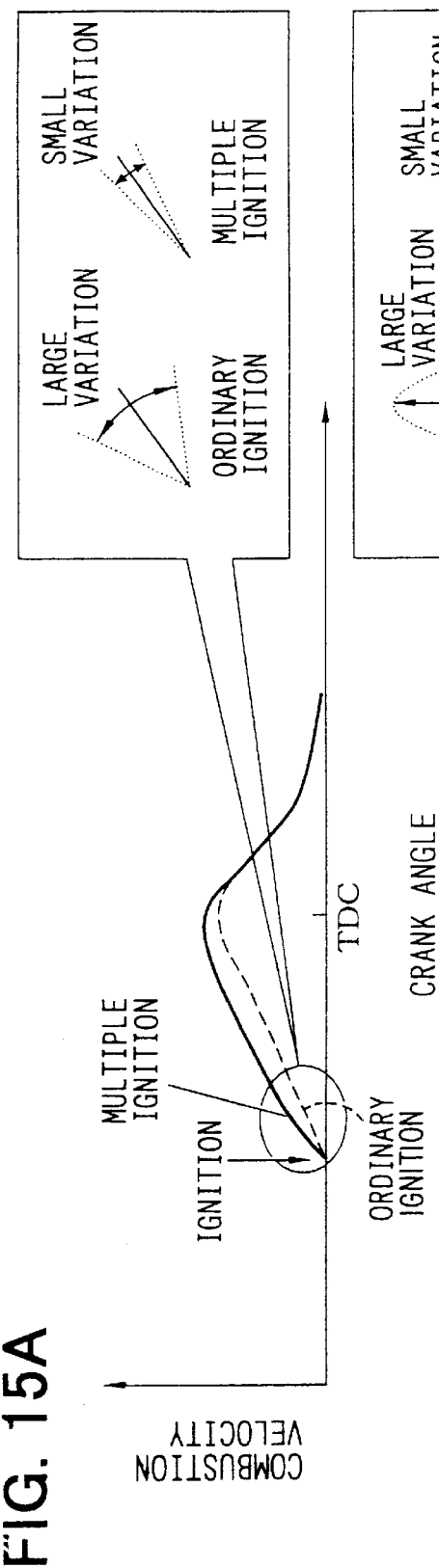
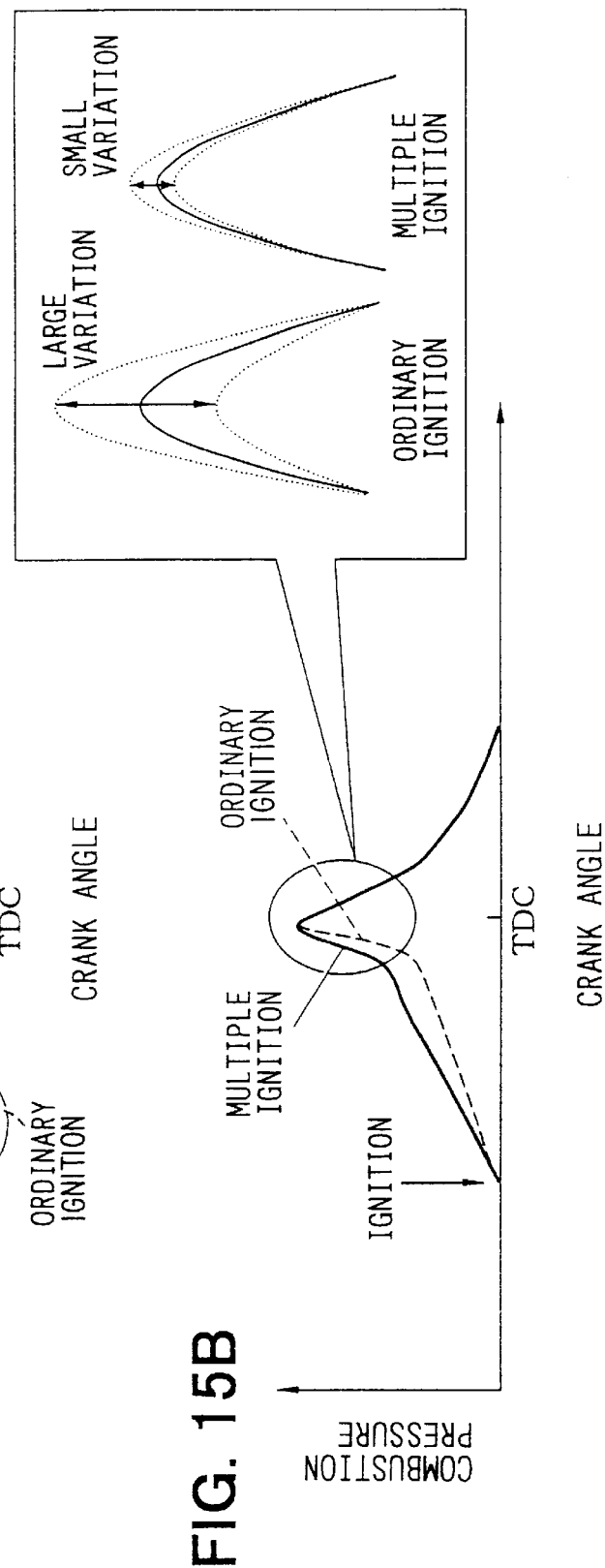
FIG. 15A
FIG. 15B

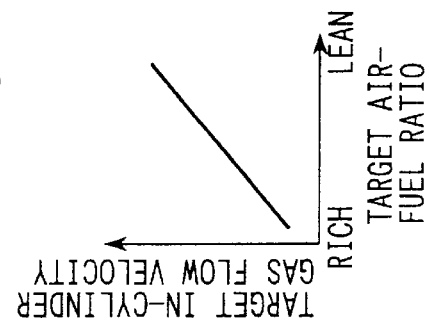
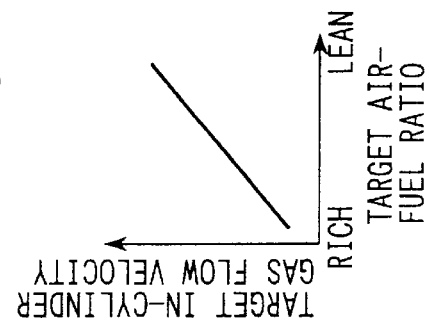
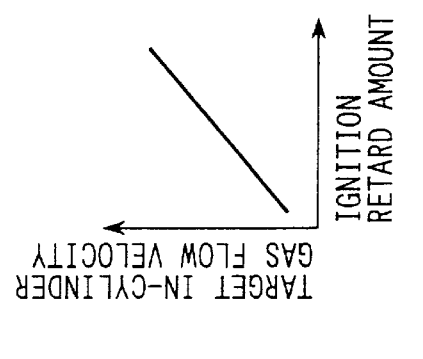
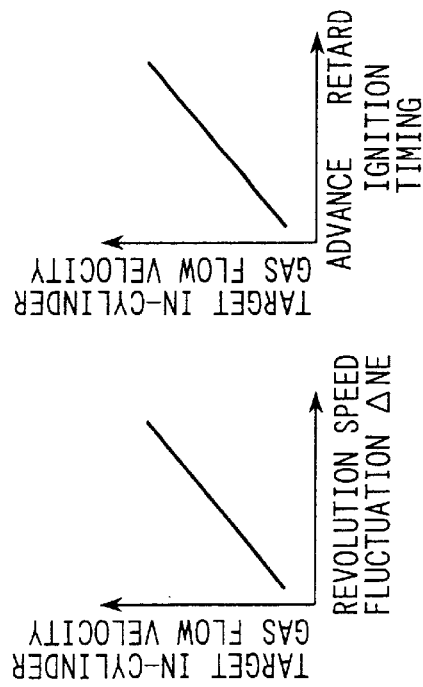
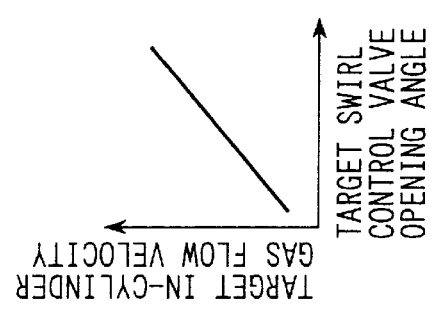
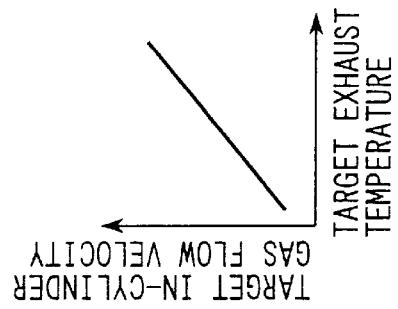

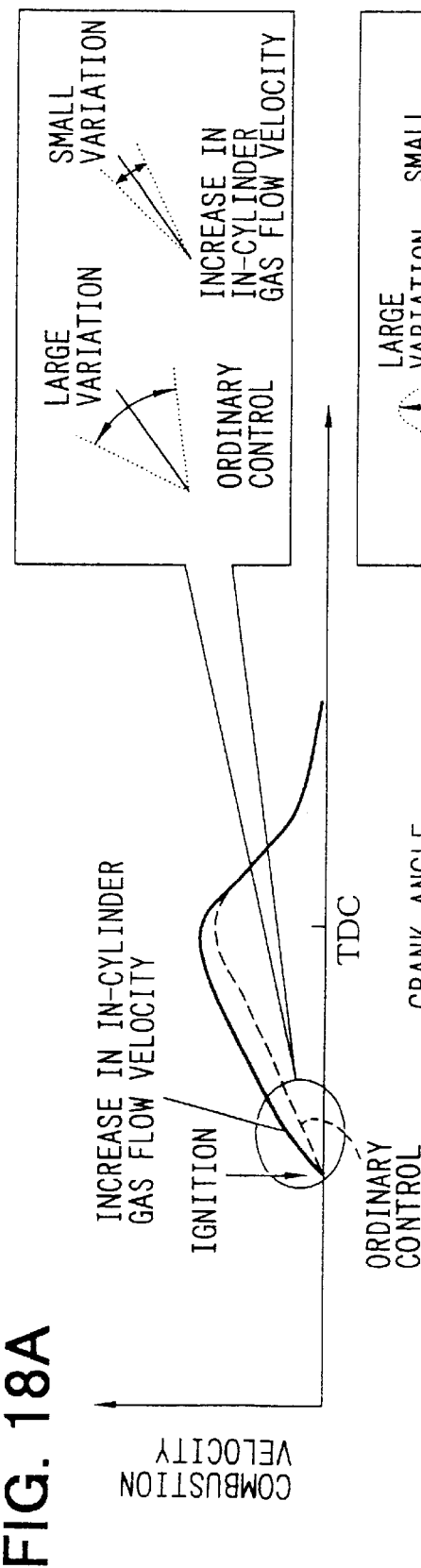
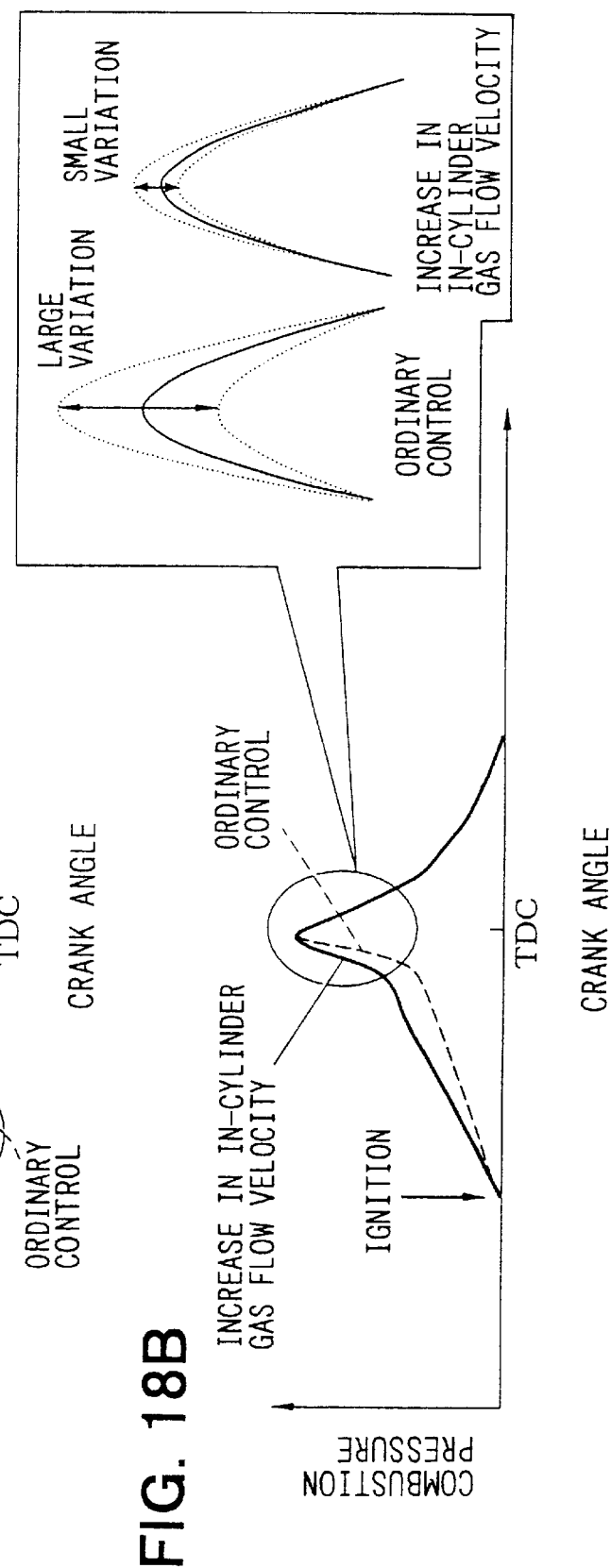
FIG. 18A
FIG. 18B

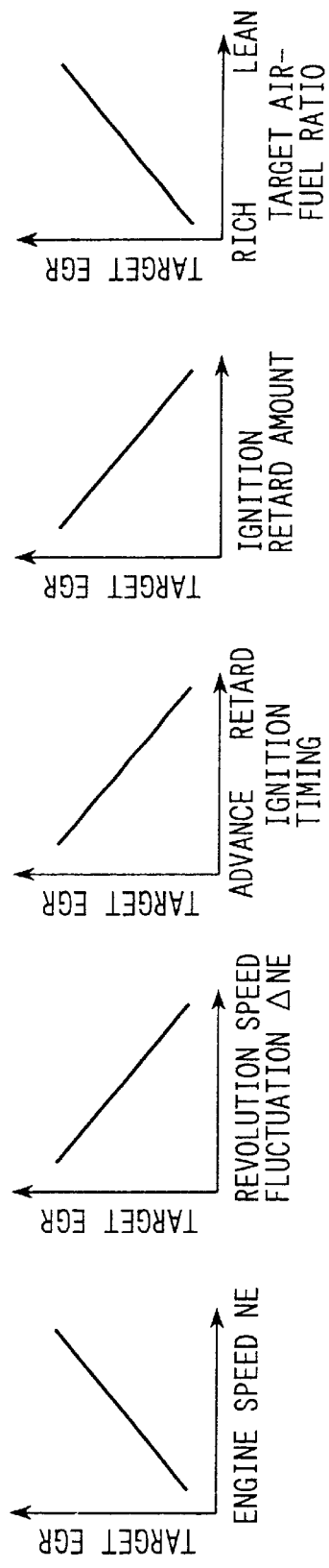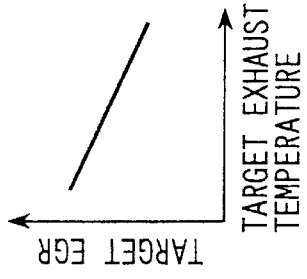

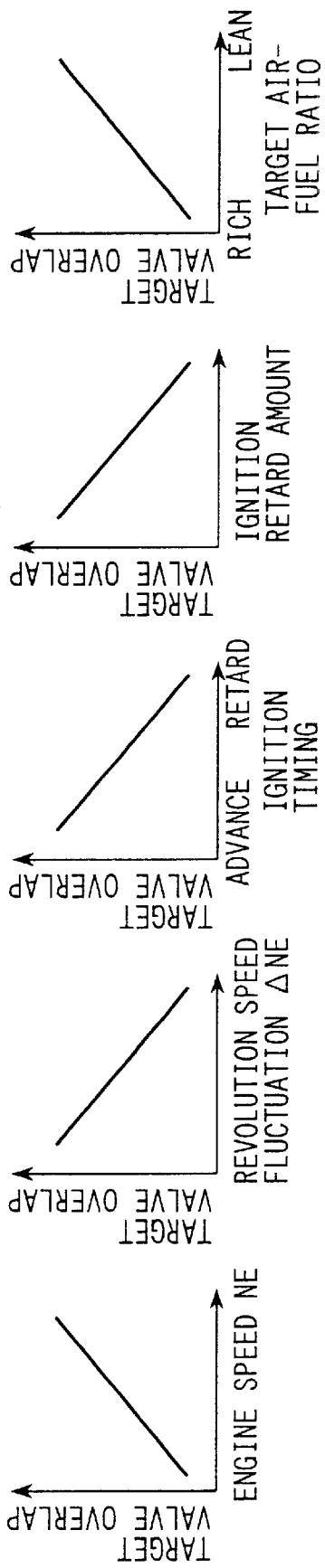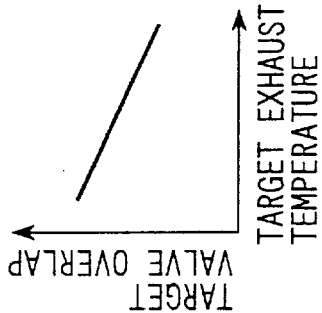

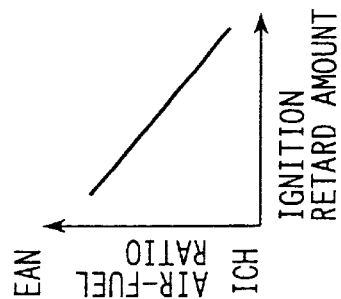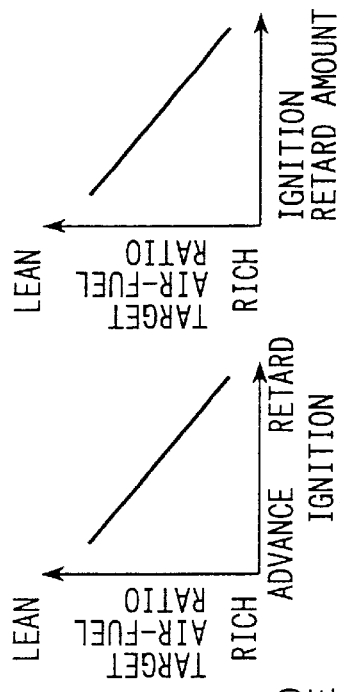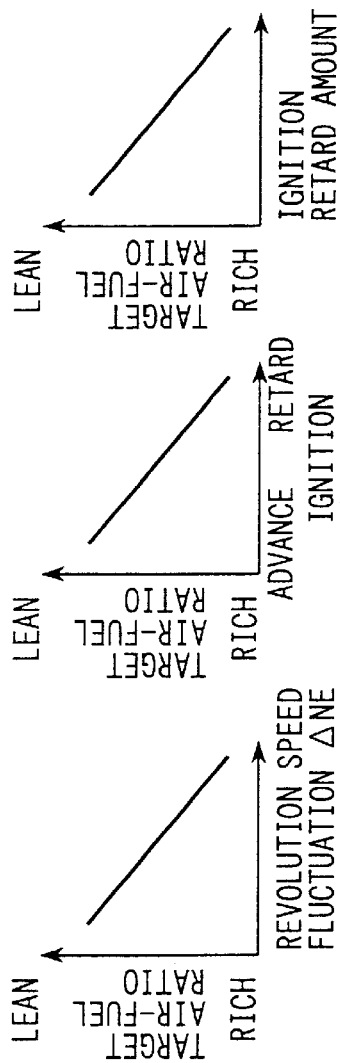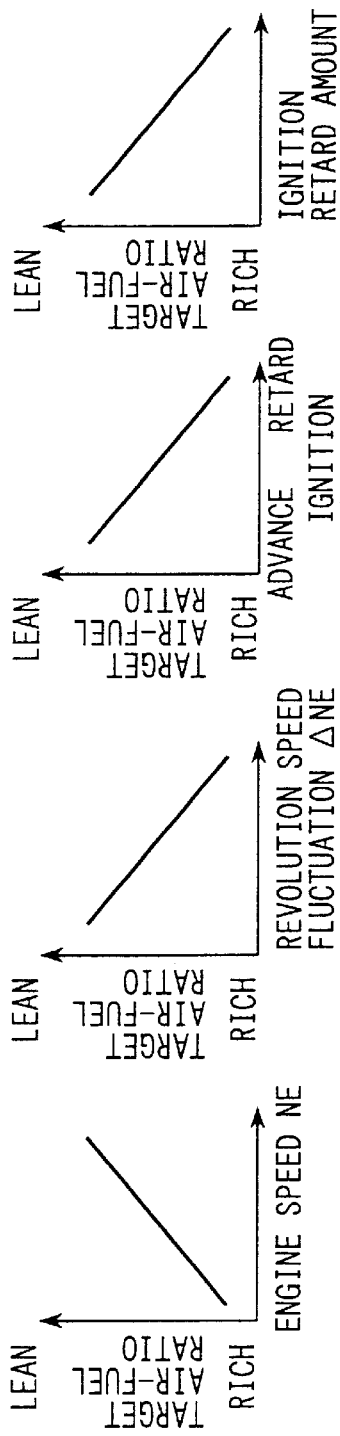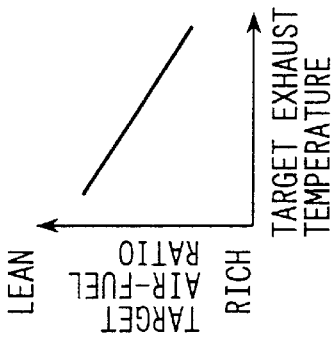

CONTROLLER FOR INTERNAL COMBUSTION ENGINE

CROSS-REFERENCE TO RELATED APPLICATION

The present invention is related to Japanese patent application No. Hei. 11-343124, filed Dec. 2, 1999; the contents of which are incorporated herein by reference.

FIELD OF THE INVENTION

The present invention relates to a controller for an internal combustion engine, and more particularly, to a controller for an internal combustion engine having an improved method of stabilizing combustion of an internal combustion engine.

BACKGROUND OF THE INVENTION

In an engine for burning a mixture by stratified charge combustion such as a direct-injection engine, the mixture forms lumps and the lumps move. As disclosed in JP-A No. H11-2172, there is a technique disclosed using a plurality of spark plugs in each cylinder. When reduction in torque is requested, ignition timing is set behind a normal timing, and the mixture is ignited by a spark plug disposed in a position where a lump of the mixture passes, thereby preventing deterioration of combustion.

As disclosed in JP-A No. H6-229297, in an engine controlling the strength of a swirl flow or the strength of a tumble flow in a cylinder, when engine speed is lower than a target idle speed, the strength of the swirl flow or the strength of the tumble flow is enhanced to stabilize combustion, thereby controlling the engine speed to the target idle speed.

In recent years, however, a higher performance engine is requested to assure stable drivability by always stabilizing combustion under any operating condition. Even when combustion under the specific operating conditions as described above is stabilized, combustion cannot be stabilized under various operating conditions other than the specific operating conditions. The request of assuring the stable drivability cannot be sufficiently addressed.

SUMMARY OF THE INVENTION

It is therefore an object of the present invention to provide a controller for an internal combustion engine, capable of assuring stable drivability by stabilizing combustion under various operating conditions.

To achieve these and other objects, a controller for an internal combustion engine of the present invention detects a combustion state of an internal combustion engine by combustion state detecting means and, when combustion becomes unstable, executes combustion stabilizing control with a combustion stabilizing control means. As such, at least the combustion velocity or combustion pressure is controlled to stabilize combustion. The combustion velocity and the combustion pressure are parameters which have the greatest effect on combustion stabilization. Therefore, when combustion becomes unstable, by controlling the combustion velocity and the combustion pressure to stabilize combustion according to the operating conditions at that time, combustion can be stabilized under various operating conditions. Thus, stable drivability is assured.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 10A is a diagram showing a map of a target injection advance amount according to an engine control state parameter according to the present invention;

FIG. 10B is a diagram showing a map of a target injection advance amount according to an engine control state parameter according to the present invention;

FIG. 10C is a diagram showing a map of a target injection advance amount according to an engine control state parameter according to the present invention;

FIG. 10D is a diagram showing a map of a target injection advance amount according to an engine control state parameter according to the present invention;

FIG. 10E is a diagram showing a map of a target injection advance amount according to an engine control state parameter according to the present invention;

FIG. 12A is a diagram showing a map of the number of target ignition times according to an engine operating parameter according to the present invention;

FIG. 12B is a diagram showing a map of the number of target ignition times according to an engine operating parameter according to the present invention;

FIG. 12C is a diagram showing a map of the number of target ignition times according to an engine operating parameter according to the present invention;

FIG. 12D is a diagram showing a map of the number of target ignition times according to an engine operating parameter according to the present invention;

FIG. 12E is a diagram showing a map of the number of target ignition times according to an engine operating parameter according to the present invention;

FIG. 12F is a diagram showing a map of the number of target ignition times according to an engine operating parameter according to the present invention;

FIG. 12G is a diagram showing a map of the number of target ignition times according to an engine operating parameter according to the present invention;

FIG. 12H is a diagram showing a map of the number of target ignition times according to an engine operating parameter according to the present invention;

FIG. 12I is a diagram showing a map of the number of target ignition times according to an engine operating parameter according to the present invention;

FIG. 13A is a diagram showing a map of target ignition time according to an engine operating parameter according to the present invention;

FIG. 13B is a diagram showing a map of target ignition time according to an engine operating parameter according to the present invention;

FIG. 13C is a diagram showing a map of target ignition time according to an engine operating parameter according to the present invention;

FIG. 13D is a diagram showing a map of target ignition time according to an engine operating parameter according to the present invention;

FIG. 13E is a diagram showing a map of target ignition time according to an engine operating parameter according to the present invention;

FIG. 13F is a diagram showing a map of target ignition time according to an engine operating parameter according to the present invention;

FIG. 13G is a diagram showing a map of target ignition time according to an engine operating parameter according to the present invention;

FIG. 13H is a diagram showing a map of target ignition time according to an engine operating parameter according to the present invention;

FIG. 13I is a diagram showing a map of target ignition time according to an engine operating parameter according to the present invention;

FIG. 14A is a diagram showing a target ignition interval according to an engine operating parameter according to the present invention;

FIG. 14B is a diagram showing a target ignition interval according to an engine operating parameter according to the present invention;

FIG. 14C is a diagram showing a target ignition interval according to an engine operating parameter according to the present invention;

FIG. 14D is a diagram showing a target ignition interval according to an engine operating parameter according to the present invention;

FIG. 14E is a diagram showing a target ignition interval according to an engine operating parameter according to the present invention;

FIG. 14F is a diagram showing a target ignition interval according to an engine operating parameter according to the present invention;

FIG. 14G is a diagram showing a target ignition interval according to an engine operating parameter according to the present invention;

FIG. 14H is a diagram showing a target ignition interval according to an engine operating parameter according to the present invention;

FIG. 14I is a diagram showing a target ignition interval according to an engine operating parameter according to the present invention;

FIG. 15A is a time chart showing the behavior of a combustion velocity and combustion pressure for explaining fuel improvement by a multiple ignition control according to the present invention;

FIG. 15B is a time chart showing the behavior of a combustion velocity and combustion pressure for explaining fuel improvement by a multiple ignition control according to the present invention;

FIG. 16A is a diagram showing a map of a target in-cylinder gas flow velocity according to an engine operating parameter according to the present invention;

FIG. 16B is a diagram showing a map of a target in-cylinder gas flow velocity according to an engine operating parameter according to the present invention;

FIG. 16C is a diagram showing a map of a target in-cylinder gas flow velocity according to an engine operating parameter according to the present invention;

FIG. 16D is a diagram showing a map of a target in-cylinder gas flow velocity according to an engine operating parameter according to the present invention;

FIG. 16E is a diagram showing a map of a target in-cylinder gas flow velocity according to an engine operating parameter according to the present invention;

FIG. 17A is a diagram showing a map of a target swirl control valve opening angle according to the target in-cylinder gas flow velocity according to the present invention FIG. 17B is a diagram showing a map of a target engine speed according to the target in-cylinder gas flow velocity according to the present invention;

FIG. 18A is a time chart showing the behavior of a combustion velocity and combustion pressure for explaining fuel improvement by the in-cylinder flow velocity control according to the present invention;

FIG. 18B is a time chart showing the behavior of a combustion velocity and combustion pressure for explaining fuel improvement by the in-cylinder flow velocity control according to the present invention;

FIG. 19A is a diagram showing a map of a target EGR rate according to an engine operating parameter according to the present invention;

FIG. 19B is a diagram showing a map of a target EGR rate according to an engine operating parameter according to the present invention;

FIG. 19C is a diagram showing a map of a target EGR rate according to an engine operating parameter according to the present invention;

FIG. 19D is a diagram showing a map of a target EGR rate according to an engine operating parameter according to the present invention;

FIG. 19E is a diagram showing a map of a target EGR rate according to an engine operating parameter according to the present invention;

FIG. 19F is a diagram showing a map of a target EGR rate according to an engine operating parameter according to the present invention;

FIG. 21A is a diagram showing a map of a target valve overlap according to an engine operating parameter according to the present invention;

FIG. 21B is a diagram showing a map of a target valve overlap according to an engine operating parameter according to the present invention;

FIG. 21C is a diagram showing a map of a target valve overlap according to an engine operating parameter according to the present invention;

FIG. 21D is a diagram showing a map of a target valve overlap according to an engine operating parameter according to the present invention;

FIG. 21E is a diagram showing a map of a target valve overlap according to an engine operating parameter according to the present invention;

FIG. 21F is a diagram showing a map of a target valve overlap according to an engine operating parameter according to the present invention;

FIG. 22A is a diagram showing a map of a target air-fuel ratio according to an engine operating parameter according to the present invention;

FIG. 22B is a diagram showing a map of a target air-fuel ratio according to an engine operating parameter according to the present invention;

FIG. 22C is a diagram showing a map of a target air-fuel ratio according to an engine operating parameter according to the present invention;

FIG. 22D is a diagram showing a map of a target air-fuel ratio according to an engine operating parameter according to the present invention;

FIG. 22E is a diagram showing a map of a target air-fuel ratio according to an engine operating parameter according to the present invention;

DETAILED DESCRIPTION OF THE PREFERRED EMBODIMENTS

Figure 1:
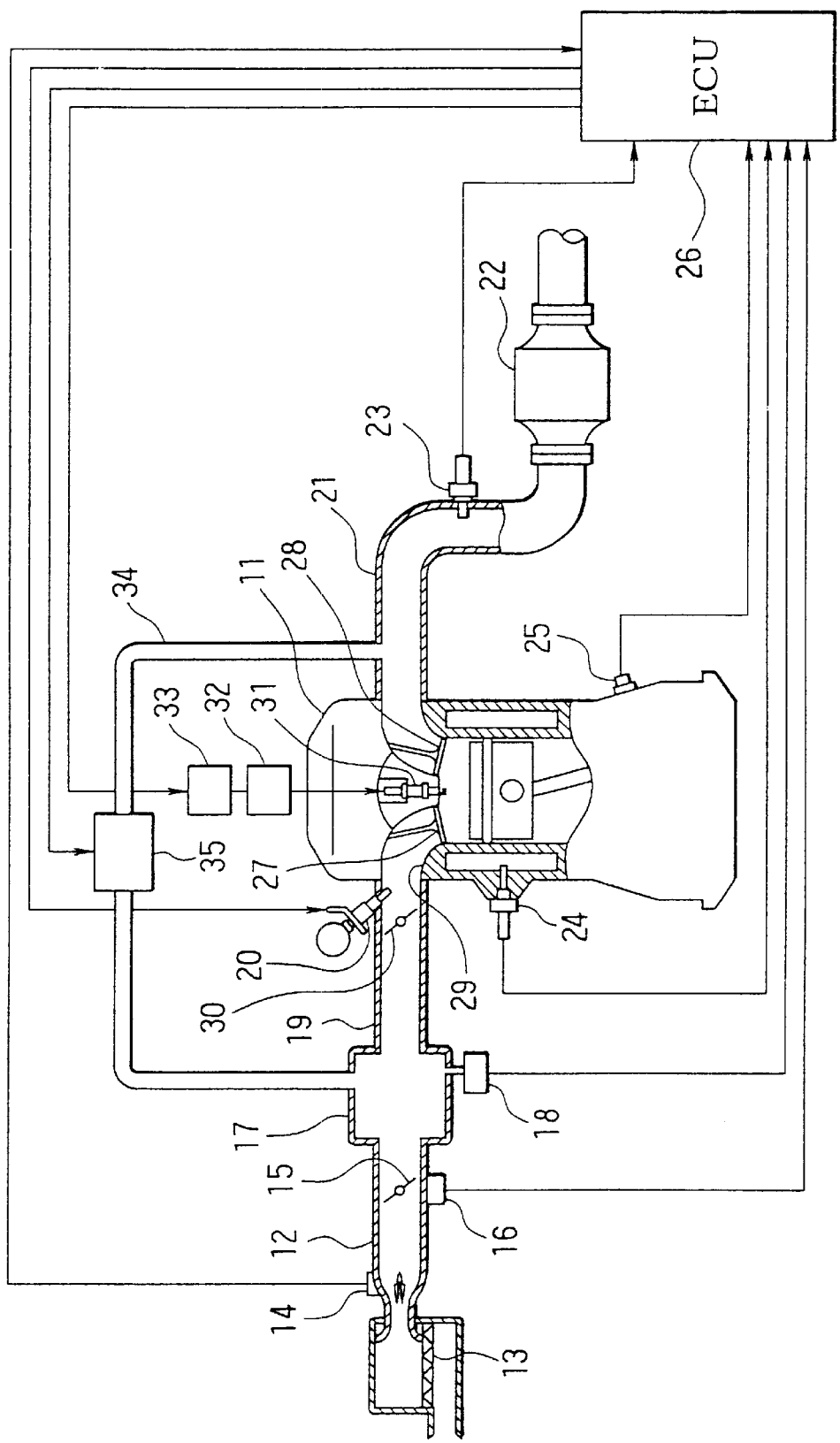
FIG. 1 is a schematic view of an engine control system according to a first embodiment of the present invention.

A schematic construction of an engine control system is described by referring to FIG. 1. An air cleaner 13 is provided at the uppermost stream part of an intake pipe 12 of an engine 11. An air flow meter 14 for detecting an intake air volume is provided downstream of the air cleaner 13. On the downstream side of the air flow meter 14, a throttle valve 15 and a throttle opening angle sensor 16 for sensing the throttle opening angle are provided.

Further, a surge tank 17 is provided downstream of the throttle valve 15 and is provided with an intake pipe pressure sensor 18 for sensing an intake pipe pressure. The surge tank 17 is also provided with an intake manifold 19 for introducing air into each cylinder of the engine 11. A fuel injection valve 20 for injecting a fuel into each cylinder is attached to a branch pipe of each cylinder of the intake manifold 19.

The engine 11 of the present embodiment is a four-valve engine in which two intake valves 27 and two exhaust valves 28 provided for each cylinder. In the intake manifold 19 of each cylinder, two intake ports 29 corresponding to the intake valves 27 are formed. In one of the two intake ports 29, a swirl control valve 30 (in-cylinder flow control means) is disposed. Based on an output signal from an engine control unit (hereinbelow, referred to as "ECU") 26, the opening angle of the swirl control valve 30 in each cylinder is controlled to thereby adjust the swirl ratio, and the strength of the swirl flow in each cylinder is adjusted. The swirl ratio is a ratio between the swirl flow velocity and the engine speed or a ratio between a velocity component in the horizontal direction of the swirl and a velocity component in the vertical direction.

Figure 2:
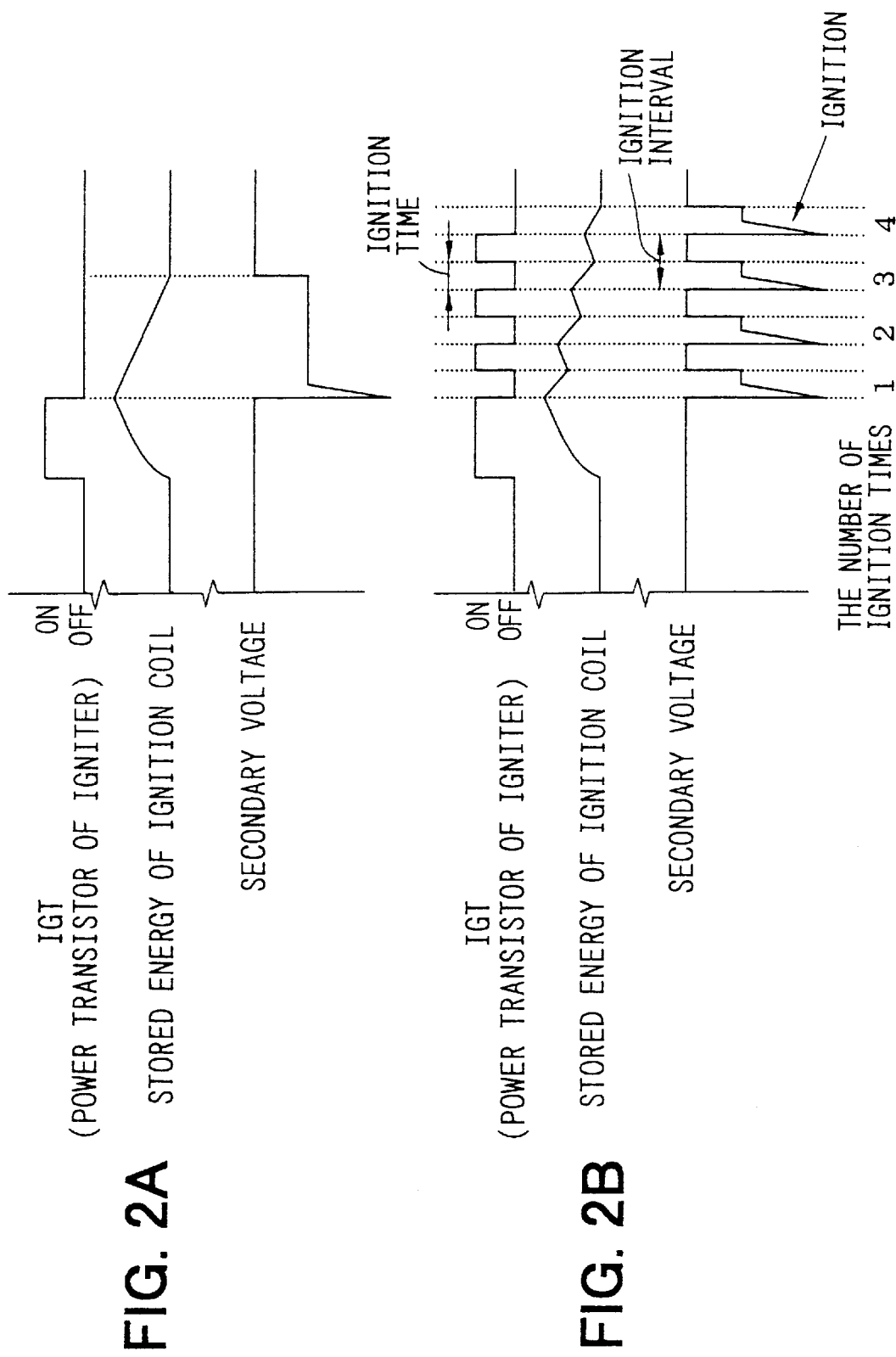
FIG. 2A is a time chart for explaining a normal ignition method according to the present invention.
FIG. 2B is a time chart illustrating a multiple ignition method according to the present invention.

In the cylinder head of the engine 11, a spark plug 31 is attached for each cylinder. A high voltage generated by a secondary coil (not shown) of an ignition coil 32 is applied to the center electrode of the spark plug 31. The primary coil (not shown) of the ignition coil 32 is connected to a power transistor in an igniter 33. An ignition device constructed by the spark plug 31, ignition coil 32, igniter 33, and the like corresponds to ignition means in claims. During engine operation, the power transistor of the igniter 33 is turned on/off at the rising edge/trailing edge of an ignition signal IGT transmitted from the ECU 26 to the igniter 33. As shown in FIG. 2A, when the power transistor of the igniter 33 is turned on, a primary current is passed to the primary coil of the ignition coil 32 and stored energy in the ignition coil 32 increases. After that, when the power transistor of the igniter 33 is turned off, the primary current is interrupted, and a high voltage is led to the secondary coil of the ignition coil 32. By the high voltage, a spark discharge is generated between the electrodes of the spark plug 31.

During multiple ignitions during a single combustion stroke, as shown in FIG. 2B, after an ordinary operation of interrupting the primary current, the power transistor of the igniter 33 is repeatedly turned on and off in predetermined cycles by the ignition signal IGT to make the spark plug 31 discharge a plurality of times, thereby successively causing the discharge (ignition).

On the other hand, as shown in FIG. 1, at some midpoint in an exhaust pipe 21 of the engine 11, a catalyst 22 such as a three-way catalyst for reducing harmful components (CO, HC, NOx, and the like) in an exhaust gas is disposed. On the upstream side of the catalyst 22, an air-fuel ratio sensor 23 for sensing the air-fuel ratio of the exhaust gas is provided. Between the upstream side of the catalyst 22 in the exhaust pipe 21 and the surge tank 17, an EGR pipe 34 for circulating a part of the exhaust to an intake system is connected, and an EGR valve 35 is provided at some midpoint of the EGR pipe 34. The opening angle of the EGR valve 35 is controlled based on an output signal from the ECU 26, and the EGR rate is adjusted according to the opening angle. The EGR rate is a proportion of an EGR amount (exhaust circulating amount) to the whole exhaust gas. A cooling water temperature sensor 24 for sensing cooling water temperature and a crank angle sensor 25 for sensing the engine speed are attached to a cylinder block of the engine 11.

Outputs of the various sensors are supplied to the ECU 26. The ECU 26 is composed almost exclusively of a microcomputer. By executing a fuel injection control program (not shown) stored in a ROM (storing medium) provided in the ECU 26, the amount of fuel injection from the fuel injection valve 20 is controlled according to an engine operating state. By executing an ignition control program, the ignition timing of the spark plug 31 is controlled.

Further, to always stabilize combustion of the engine 11, by executing programs shown in FIGS. 3 to 7, the ECU 26 detects combustion of each cylinder. When combustion becomes unstable and when the engine 11 operates under operating conditions which deteriorate the stability of combustion (hereinbelow, called "combustion stability deteriorating operating conditions"), the ECU 26 executes the combustion stabilizing control. In the combustion stabilizing control, by controlling the ignition timing, ignition method, in-cylinder gas flow velocity, EGR rate, or air-fuel ratio for each cylinder, the combustion velocity and the combustion pressure are controlled according to an engine operating parameter to thereby stability combustion. Control items of the combustion stabilizing control will now be described.

Control of ignition timing.

Figure 11A:
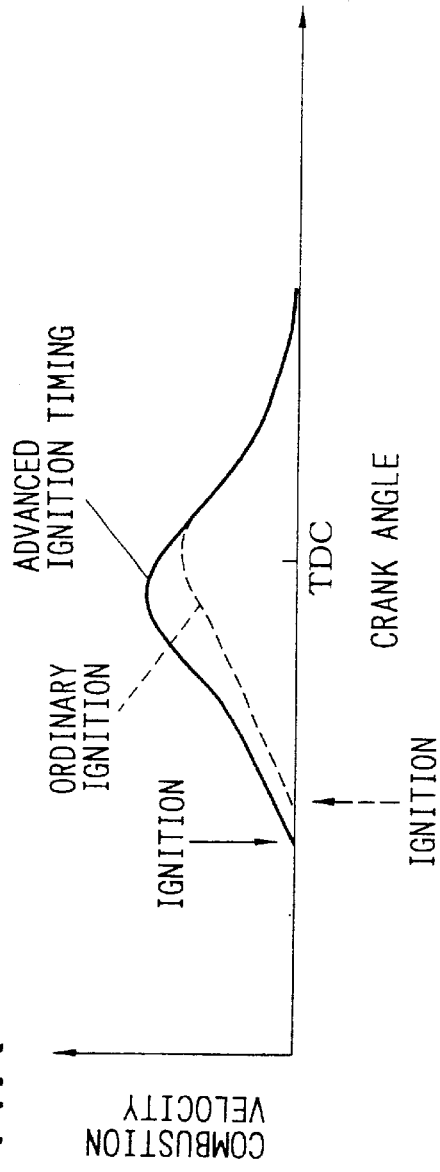
FIG. 11A is a time chart showing the behavior of combustion velocity and combustion pressure for fuel improvement by an ignition timing control according to the present invention.
Figure 11B:
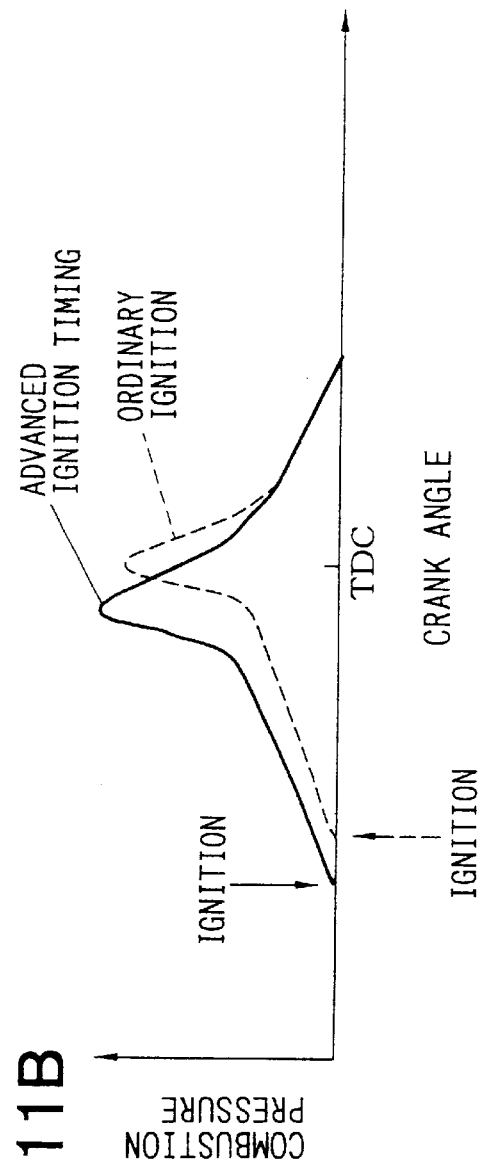
FIG. 11B is a time chart showing the behavior of combustion velocity and combustion pressure for fuel improvement by an ignition timing control according to the present invention.

In ignition timing control, the ignition timing of the spark plug 31 is corrected to advance, thereby stabilizing combustion. Here, a final target ignition advance amount is set by using a map of the target ignition advance amount using a parameter of the engine speed NE, revolution speed fluctuation $\Delta NE$, ignition timing, target air-fuel ratio, or target exhaust temperature shown in FIGS. 10A to 10E. As shown in FIG. 11, when the ignition timing of the spark plug 31 is corrected to advance, the combustion velocity and the combustion pressure can be increased as compared with the case of ordinary ignition, so that combustion can be stabilized.

Ignition control method

In the ignition control method, multiple ignitions for a single combustion stroke is adopted. By controlling the number of ignition times in a single combustion stroke, stabilization of combustion is attempted. The final target number of ignition times during a single combustion stroke is set by using a map of the target number of ignition times using the engine speed NE, revolution speed fluctuation $\Delta NE$, ignition timing, ignition retard amount, target air-fuel ratio, target exhaust temperature, in-cylinder gas flow velocity, swirl ratio, or EGR rate as parameters shown in FIGS. 12A to 12I. Here, the ignition time and ignition interval (refer to FIG. 2) may be set as fixed values. The final target ignition time may be set by using a map of the target ignition time using, as parameters, the engine speed NE, revolution speed fluctuation $\Delta NE$, ignition timing, ignition retard amount, target air-fuel ratio, target exhaust temperature, in-cylinder gas flow velocity, swirl ratio, or EGR rate shown in FIGS. 13A to 13I. The final target ignition interval may be set by using a map of the target ignition interval using, as parameters, the engine speed NE, revolution speed fluctuation $\Delta NE$, ignition timing, ignition retard amount, target air-fuel ratio, target exhaust temperature, in-cylinder gas flow velocity, swirl ratio, and EGR rate shown in FIGS. 14A to 14I. Each target number of ignition times, target ignition time, and target ignition interval may be obtained from maps using in-cylinder pressure and cooling water temperature as parameters.

As shown in FIG. 15, when multiple ignition is performed by the spark plug 31, variations in combustion velocity and combustion pressure can be suppressed as compared with ordinary ignition, so that combustion can be stabilized. Since the multiple ignition controls only a flame generating state in a cylinder, the multiple ignition can be executed under various operating conditions without constraints of those operating conditions.

Control of in-cylinder gas flow velocity.

In the control of the in-cylinder gas flow velocity, stabilization of combustion is attempted by increasing the in-cylinder gas flow velocity. Here, a final in-cylinder gas flow velocity is set from a map of the target in-cylinder gas flow velocity using the revolution speed fluctuation $\Delta NE$, ignition timing, ignition retard amount, target air-fuel ratio, and target exhaust temperature as parameters shown in FIGS. 16A to 16E. Although the in-cylinder gas flow velocity can be controlled by the opening angle (swirl ratio) of the swirl control valve 30, it can be also controlled by the engine speed NE. When controlling the in-cylinder gas flow velocity according to the opening angle of the swirl control valve 30, the target swirl control valve opening angle (target swirl ratio) is set by using a map of the target swirl control valve opening angle according to the target in-cylinder gas flow velocity shown in FIG. 17A. When controlling the in-cylinder gas flow velocity according to the engine speed NE, the target engine speed NE is set by using a map of the target engine speed according to the target in-cylinder gas flow velocity shown in FIG. 17B.

As shown in FIG. 18, when the in-cylinder gas flow velocity is increased, variations in combustion velocity and combustion pressure can be suppressed as compared with an ordinary control, so that combustion can be stabilized. Since the control of the in-cylinder gas flow velocity is just to control the in-cylinder gas flow velocity, it can be executed under various operating conditions without constraints of the operating conditions.

Control of EGR rate.

Figures 20A, 20B:
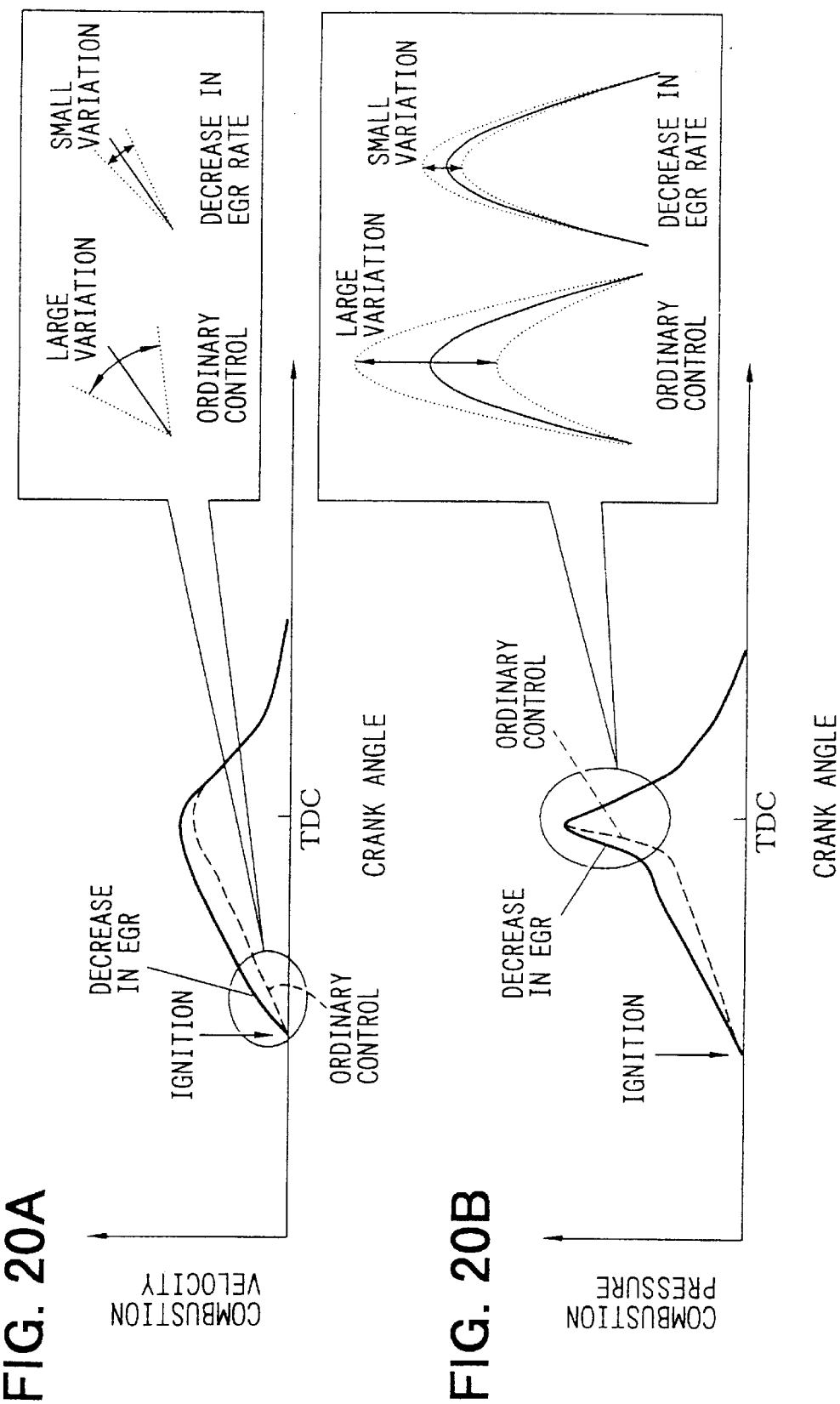
FIG. 20A is a time chart showing the behavior of a combustion velocity and combustion pressure for explaining fuel improvement by the EGR rate control according to the present invention.
FIG. 20B is a time chart showing the behavior of a combustion velocity and combustion pressure for explaining fuel improvement by the EGR rate control according to the present invention.

In the control of the EGR rate, the opening angle of the EGR valve 35 is set to a small value to decrease the EGR rate to stabilize combustion. Here, a final target EGR rate is set from a map of the target EGR rate using, as parameters, the engine speed NE, revolution speed fluctuation $\Delta NE$, ignition timing, ignition retard amount, target air-fuel ratio, and target exhaust temperature shown in FIGS. 19A to 19F. As shown in FIG. 20, when the EGR rate is lowered, variations in combustion velocity and combustion pressure can be suppressed as compared with an ordinary control, so that combustion can be stabilized.

Control of valve overlap amount.

In a system having a mechanism capable of varying an overlap amount of the intake valve 27 and the exhaust valve 28 such as a variable valve timing mechanism, by decreasing the valve overlap amount to thereby reduce an internal EGR amount, stabilization of combustion is attempted. Here, it is sufficient to set a final target valve overlap amount from a map of the target valve overlap amount using, as parameters, the engine speed NE, revolution speed fluctuation $\Delta NE$, ignition timing, ignition retard amount, target air-fuel ratio, and target exhaust temperature shown in FIGS. 21A to 21F.

Control of air-fuel ratio.

Figures 23A, 23B:
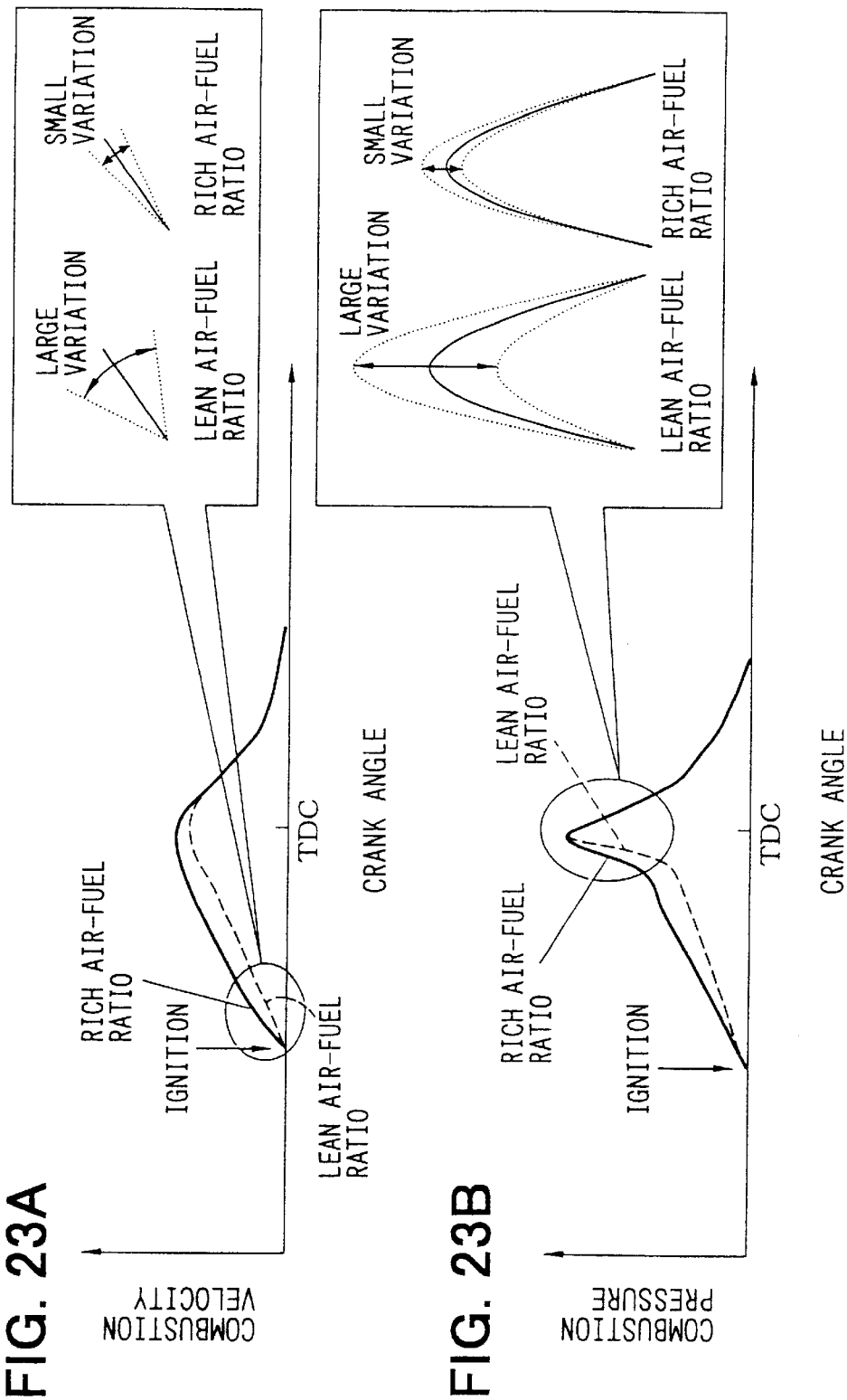
FIG. 23A is a time chart showing the behavior of a combustion velocity and combustion pressure for explaining fuel improvement by the air-fuel ratio control according to the present invention.
FIG. 23B is a time chart showing the behavior of a combustion velocity and combustion pressure for explaining fuel improvement by the air-fuel ratio control according to the present invention.

In the control of an air-fuel ratio, stabilization of combustion is attempted by controlling the air-fuel ratio to rich. Here, a final target air-fuel ratio is set from a map of the target air-fuel ratio using, as parameters, the engine speed NE, revolution speed fluctuation ΔNE, ignition timing, ignition retard amount, and target exhaust temperature shown in FIGS. 22A to 22E. As shown in FIG. 23, when the air-fuel ratio is corrected to rich, variations in combustion velocity and combustion pressure can be suppressed, so that combustion can be stabilized.

By executing the programs in FIGS. 3 to 7, the ECU 26 selects at least one of the control items and stabilizes combustion during the combustion stabilizing control. The process in FIGS. 3 to 7 will be described hereinbelow.

Combustion stabilizing control.

Figure 3:
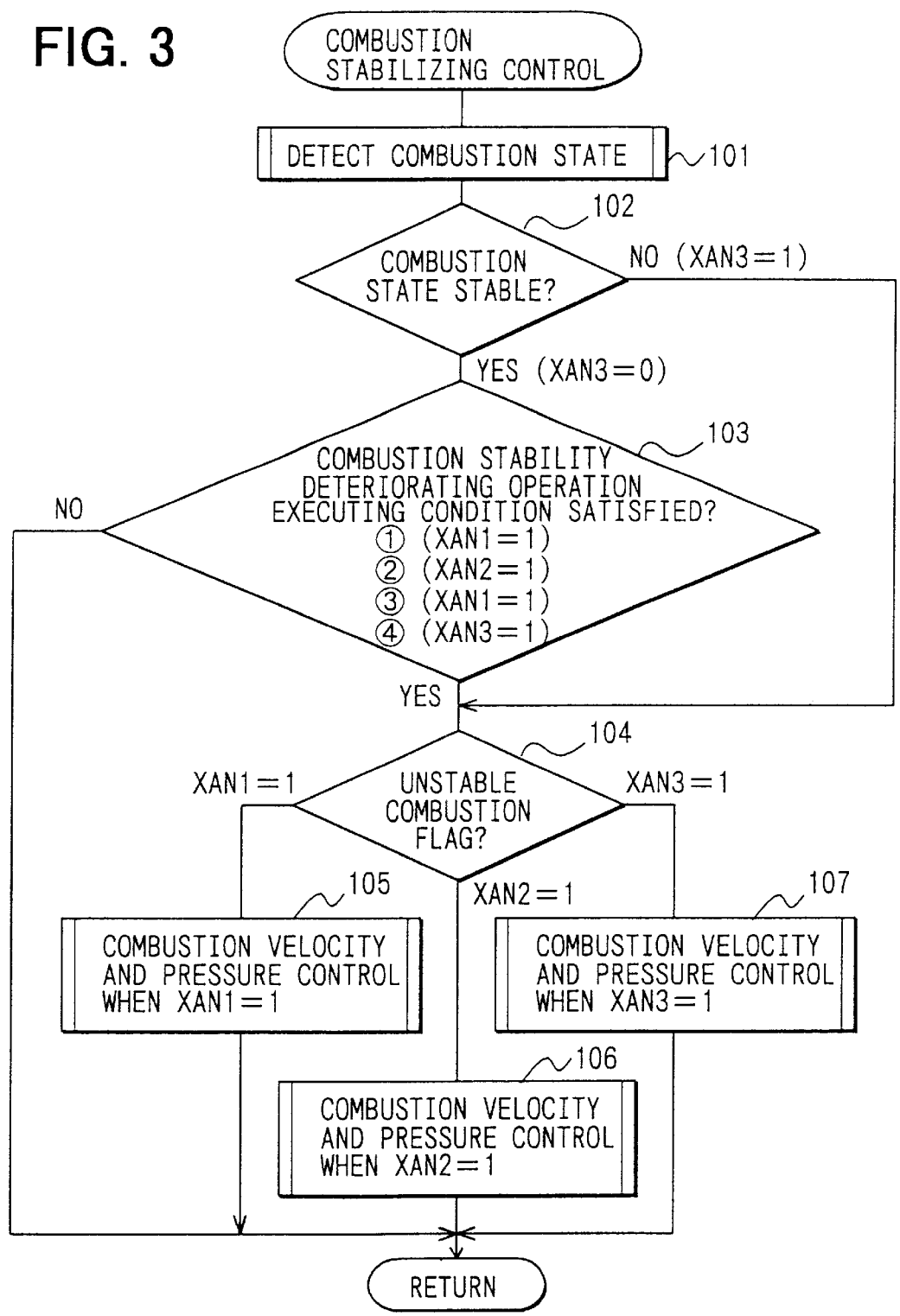
FIG. 3 is a flowchart showing the processes of a combustion stabilizing control program according to the present invention.

The combustion stabilizing control program of FIG. 3 is executed during a predetermined period or every predetermined crank angle. When the program is started, first, in step 101, a combustion state detecting program of FIG. 4 which will be described hereinlater is executed to detect combustion. According to the detection result, a third unstable combustion flag XAN3 is set to "0" indicating that combustion is stable or "1" indicating that combustion is unstable. Next, the program advances to step 102 where whether combustion is stable (XAN3=0) or not is determined. When it is determined that combustion is unstable (XAN3=1), the program advances to a combustion stabilizing process in step 104 and subsequent steps.

On the other hand, when it is determined that combustion is stable (XAN3=0), the program advances to step 103 where whether conditions of executing an operation which deteriorates the stability of combustion (hereinbelow, called "combustion stability deteriorating operation") are satisfied or not is determined. The conditions of executing the combustion stability deteriorating operation are, for example, the following 1 to 4.

1. lean-burn operating condition is satisfied (XAN1=1), 2. exhaust temperature increasing control condition is satisfied (XAN2=1), 3. idle speed decreasing control condition is satisfied (XAN1=1), and 4. decelerating operation condition is satisfied (XAN3=1). When the lean-burn operating condition of 1 is satisfied, the air-fuel ratio is controlled to lean, so that stability of combustion deteriorates. Here, the first unstable combustion flag XAN1 is set to "1". When the exhaust temperature increasing control condition of 2 is satisfied, the ignition timing is retarded, so that the stability of combustion deteriorates. Here, the second unstable combustion flag XAN2 is set to "1". When the idle speed decreasing control condition of 3 is satisfied, the intake air volume during idle operation is further reduced, so that the stability of combustion deteriorates. Here, similar to where the lean-burn operating condition is satisfied, the first unstable combustion flag XAN1 is set to "1". When the throttle valve 15 is closed in a steady driving mode or during acceleration and deceleration condition of 4 is satisfied, the engine speed suddenly drops. The stability of combustion therefore deteriorates. Here, the third unstable combustion flag XAN3 is set to "1".

When all the conditions 1 to 4 are not satisfied, the current combustion state is stable and the combustion stability deteriorating operation is not executed. The program is therefore finished without performing the following combustion stabilizing processes (step 104 to 107).

Contrarily, when even only one of the conditions of 1 to 4 is satisfied, the combustion stability deteriorating operation is executed. Consequently, to minimize an adverse influence on combustion, the program advances to the combustion stabilizing control of step 104 and subsequent steps.

In the combustion stabilizing control, first, in step 104, the specific unstable combustion flag to be set is determined. When the first unstable combustion flag XAN1=1 is determined, the lean-burn operation or idle speed decreasing control is executed. The program advances to step 105 to not hinder the target of the control. The combustion velocity and combustion pressure control program when XAN1=1 in FIG. 5 which will be described hereinlater is executed, and combustion is stabilized by controlling the combustion velocity and the combustion pressure by a control item other than the air-fuel ratio (that is, the ignition timing, ignition method, EGR rate, or in-cylinder gas flow velocity).

When the second unstable combustion flag XAN2=1 is determined, the exhaust temperature increasing control (ignition retarding control) is executed. Here, the ignition timing control (ignition timing advancing correction) and the air-fuel ratio control (correction of the air-fuel ratio to rich) delay the increase in exhaust temperature. The program advances to step 106 where the combustion velocity and combustion pressure control program when XAN2=1 in FIG. 6 (which will be described hereinlater) is executed. By controlling the combustion velocity and the combustion pressure by the control items other than the ignition timing and the air-fuel ratio (that is, ignition method, EGR rate, or in-cylinder gas flow velocity), combustion is stabilized.

When the third unstable combustion flag XAN3=1, deceleration condition is satisfied or combustion is unstable. It is consequently determined that there is no need to restrict the control items of the combustion stabilizing control and the program advances to step 107 where the combustion velocity and combustion pressure control program when XAN3=1 in FIG. 7 which will be described hereinlater is executed. The combustion velocity and the combustion pressure are controlled by at least the ignition timing, ignition method, air-fuel ratio, in-cylinder gas flow velocity of mixture, or EGR amount, thereby stabilizing combustion.

Detection of combustion state.

Figure 4:
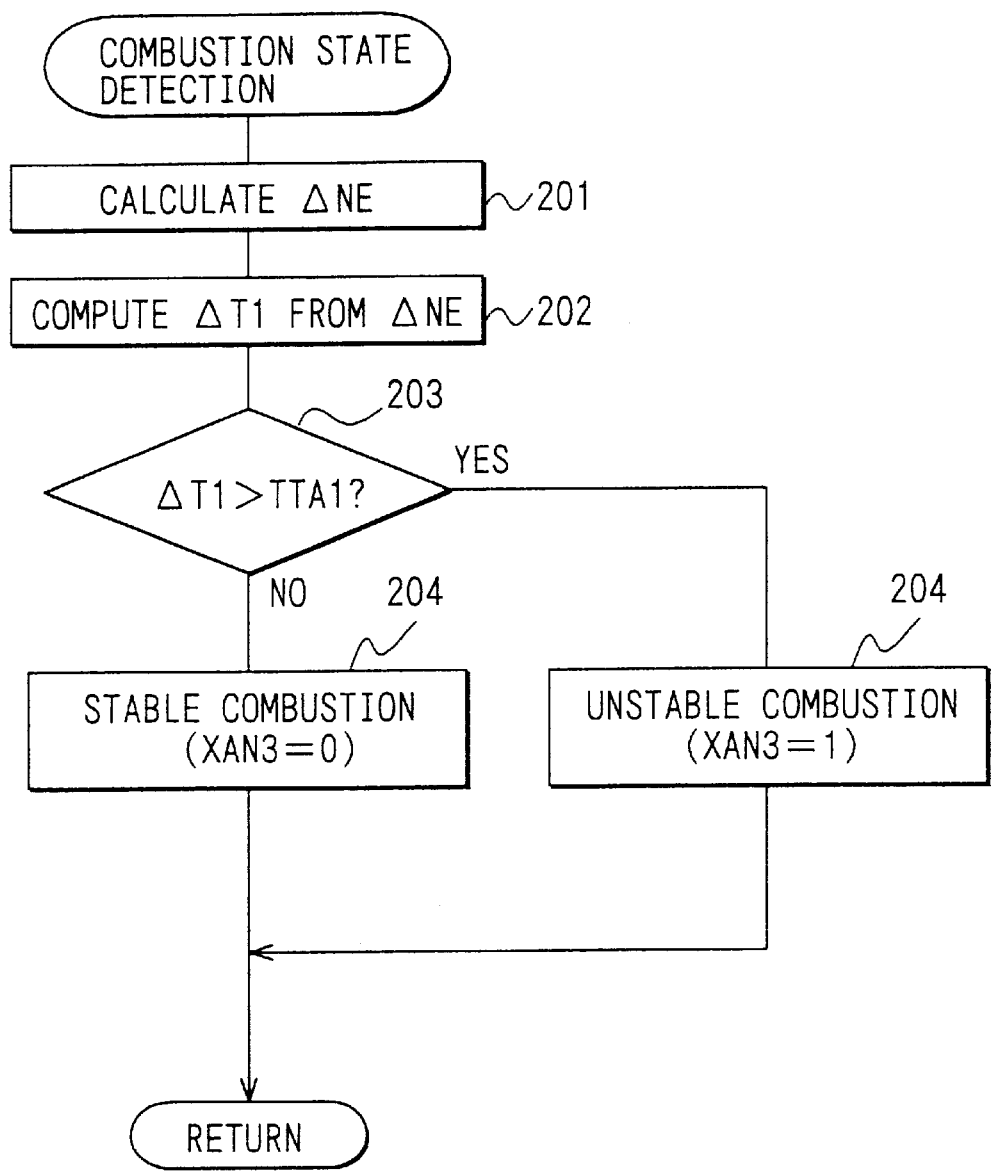
FIG. 4 is a flowchart showing the process of a combustion state detecting program according to the present invention.
Figures 8, 9A, 9B:
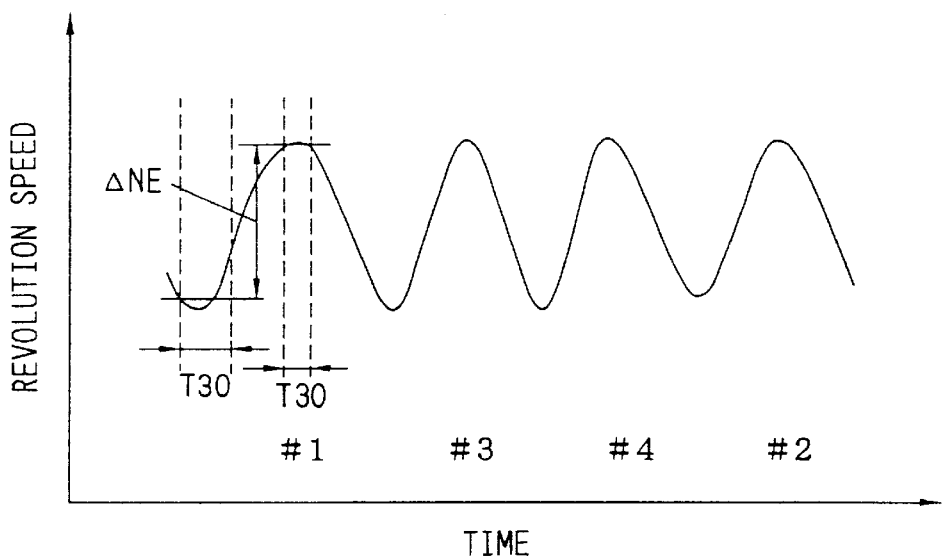
FIG. 8 is a time chart for explaining a method of calculating a revolution speed fluctuation ΔNE according to the present invention.
FIG. 9A is a diagram showing a map of an allowable torque fluctuation according to engine speed according to the present invention.
FIG. 9B is a diagram showing a map of an allowable torque fluctuation according to engine speed and intake air volume according to the present invention.

A combustion state detecting program of FIG. 4 is executed in step 101 in FIG. 3. When the program is started, first, in step 201, the revolution speed fluctuation ΔNE in association with ignition in each cylinder is calculated. As shown in FIG. 8, the revolution speed fluctuation ΔNE is calculated from the difference between the maximum value and the minimum value of the revolution speed obtained from time T30 required for the crank shaft to revolute by a predetermined crank angle (for example, 30° CA) in a combustion stroke of each cylinder.

After that, the program advances to step 202 where a torque fluctuation ΔT1 is calculated from the revolution speed fluctuation ΔNE. In the following step 203, whether the torque fluctuation ΔT1 is larger than a first allowable torque fluctuation TTA1 is determined. The first allowable torque fluctuation TTA1 may be a fixed value. To improve the accuracy of determining combustion, the first allowable torque fluctuation TTA1 may be set according to the engine operating state. For example, the first allowable torque fluctuation TTA1 may be calculated by a map shown in the upper row in FIG. 9A or a mathematical expression according to the engine speed NE or a map shown in the lower stage in FIG. 9B or a mathematical expression according to the engine speed NE and the intake air volume GA.

When it is determined that the torque fluctuation ΔT1 is smaller than the first allowable torque fluctuation TTA1, the program advances to step 204 where it is determined that combustion is stable and the third unstable combustion flag XAN3 is reset to "0". On the other hand, when it is determined that the torque fluctuation ΔT1 is larger than the first allowable torque fluctuation TTA1, the program advances to step 205 where it is determined that combustion is unstable, and the third unstable combustion flag XAN3 is set to "1".

Combustion velocity and combustion pressure control when XAN1=1.

The combustion velocity and combustion pressure control program when XAN1=1 (lean-burn operation or idle speed decreasing control) of FIG. 5 executed in step 105 in FIG. 3 will now be described. First, in steps 301 to 303, similar to steps 201 to 203 in FIG. 2, the revolution speed fluctuation ΔNE is calculated, the torque fluctuation ΔT1 is computed from the revolution speed fluctuation ΔNE and, after that, whether the torque fluctuation ΔT1 is larger than the first allowable torque fluctuation TTA1 is determined.

When the torque fluctuation ΔT1 is smaller than the first allowable torque fluctuation TTA1, although the current combustion state is stable, combustion may become unstable by the lean-burn operation or idle speed decreasing control. The program therefore advances to step 304 where the combustion stabilizing control is executed by at least the ignition method, in-cylinder gas flow velocity, and EGR rate as control items which do not exert much influence on the lean-burn operation or idle speed decreasing control, thereby preventing unstable combustion during the lean-burn operation or the idle speed decreasing control. The program is then finished.

Contrarily, when the torque fluctuation ΔT1 is larger than the first allowable torque fluctuation TTA1, combustion is unstable. The program therefore advances to step 305 where the combustion stabilizing control is executed by at least the ignition timing, ignition method, in-cylinder gas flow velocity, and EGR rate. The ignition timing is added to the process in step 304 to enhance the combustion improving effect. In step 306, whether the torque fluctuation ΔT2 during execution of the combustion stabilizing control is larger than the second allowable torque fluctuation TTA2 is determined. The second allowable torque fluctuation TTA2 may be a fixed value. To improve the accuracy of determining combustion, the second allowable torque fluctuation TTA2 may be set according to the engine operating state. For example, the second allowable torque fluctuation TTA2 may be calculated by a map shown in the lower row in FIG. 9A or a mathematical expression according to the engine speed NE. The second allowable torque fluctuation TTA2 may be also calculated by a map shown in FIG. 9B or a mathematical expression according to the engine speed NE and the intake air volume GA.

When the torque fluctuation ΔT2 during execution of the combustion stabilizing control is smaller than the second allowable torque fluctuation TTA2, it is determined that combustion is stabilized, and the program is finished.

On the other hand, when the torque fluctuation ΔT2 during execution of the combustion stabilizing control is larger than the second allowable torque fluctuation TTA2, combustion is not improved. It is determined that priority should be given to stabilization of combustion over the current control targets (lean air-fuel ratio and lower idle speed), the program advances to step 307 where the air-fuel ratio is corrected to rich, and the program is finished.

Combustion velocity and combustion pressure control when XAN2=1.

Figure 6:
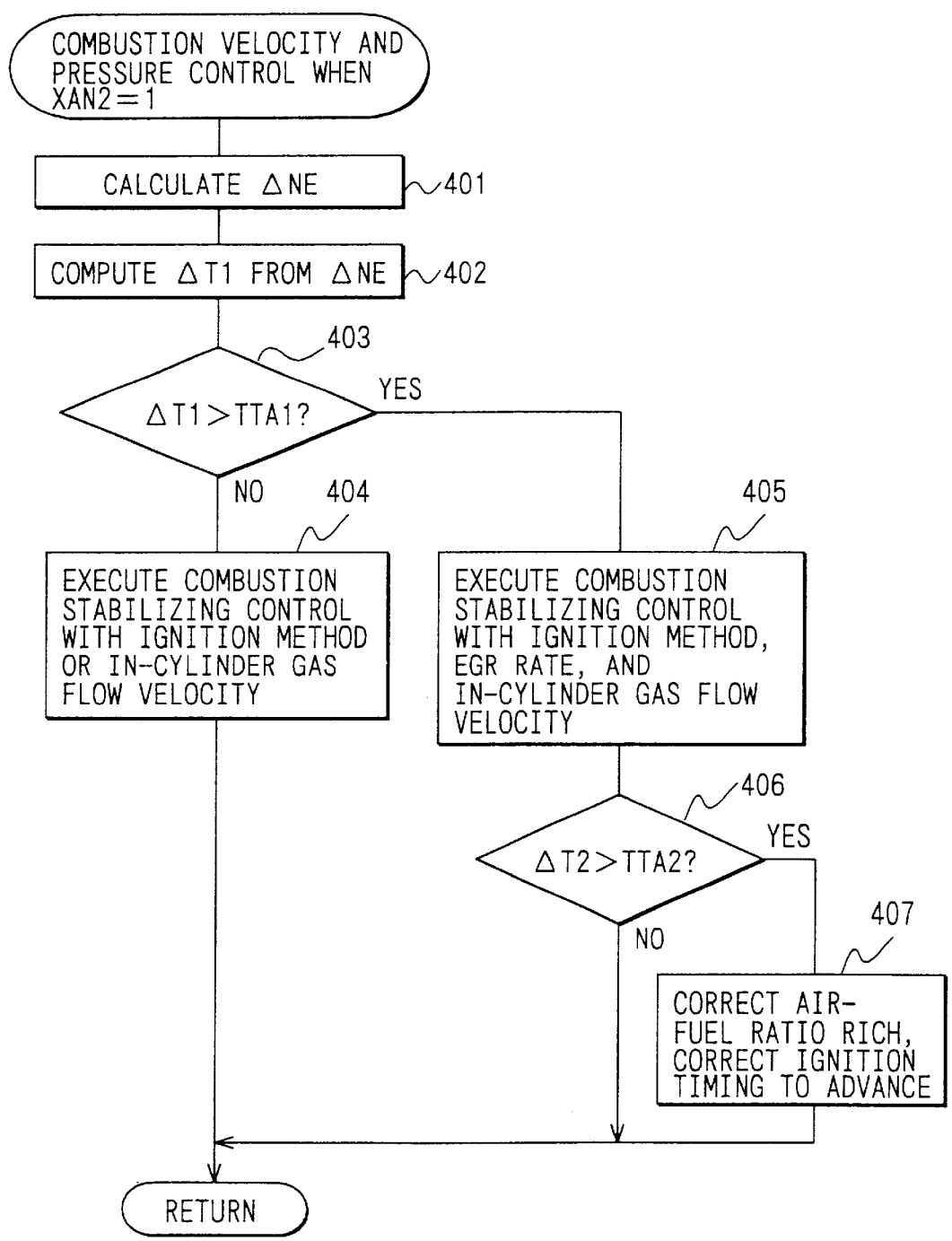
FIG. 6 is a flowchart showing the process of a combustion velocity and combustion pressure control program according to the present invention.

A combustion velocity and combustion pressure control program when XAN2=1 (during exhaust temperature increasing control) of FIG. 6 is executed in step 106 in FIG. 3. In this program, whether the torque fluctuation ΔT1 calculated from the revolution speed fluctuation ΔNE is larger than the first allowable torque fluctuation TTA1 is determined (steps 401 to 403). When the torque fluctuation ΔT1 is smaller than TTA1, although the current combustion state is stable, combustion may become unstable by the exhaust temperature increasing control. The program therefore advances to step 404 where the combustion stabilizing control is executed by at least the ignition method or the in-cylinder gas flow velocity as control items which do not exert much influence on the exhaust temperature increasing control, thereby preventing unstable combustion during the exhaust temperature increasing control. The program is then finished.

Contrarily, when the torque fluctuation ΔT1 is larger than the first allowable torque fluctuation TTA1, combustion is unstable. The program advances to step 405 where the combustion stabilizing control is executed by at least the ignition method, in-cylinder gas flow velocity, or EGR rate. The EGR rate is added to the process in step 404 to enhance the combustion improving effect. In step 406, whether the torque fluctuation ΔT2 during execution of the combustion stabilizing control is larger than the second allowable torque fluctuation TTA2 or not is determined.

When the torque fluctuation ΔT2 during execution of the combustion stabilizing control is smaller than the second allowable torque fluctuation TTA2, it is determined that combustion is stabilized, and the program is finished.

On the other hand, when the torque fluctuation ΔT2 during execution of the combustion stabilizing control is larger than the second allowable torque fluctuation TTA2, combustion is not improved. It is determined that priority should be given to stabilization of combustion over the current control target (high exhaust temperature), the program advances to step 407 where the air-fuel ratio is corrected to rich, the ignition timing is advanced, and the program is finished.

Combustion velocity and combustion pressure control when XAN3=1.

Figure 7:
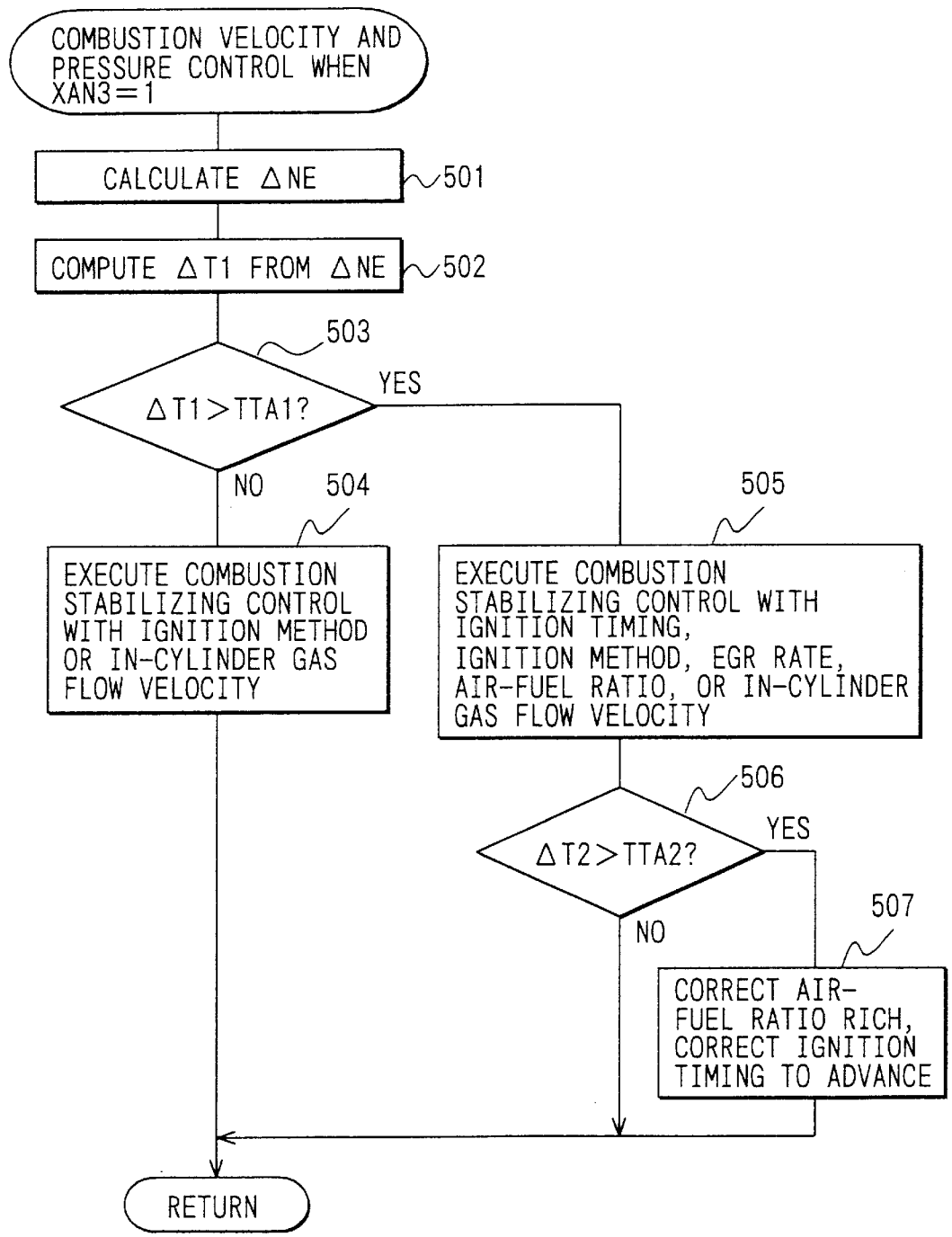
FIG. 7 is a flowchart showing the process of a combustion velocity and combustion pressure control program when according to the present invention.

A combustion velocity and combustion pressure control program when XAN3=1 (during decelerating operation or when combustion is unstable) in FIG. 7 is executed in step 107 in FIG. 3. In this program, whether the torque fluctuation ΔT1 calculated from the revolution speed fluctuation ΔNE is larger than the first allowable torque fluctuation TTA1 is determined (steps 501 to 503). When the torque fluctuation ΔT1 is smaller than the first allowable torque fluctuation TTA1, although the current combustion state is stable, combustion may become unstable by decelerating. The program therefore advances to step 504 where the combustion stabilizing control is executed by using at least the ignition method or the in-cylinder gas flow velocity as control items which have the smallest influence on deceleration, thereby preventing unstable combustion during deceleration. The program is then finished.

Contrarily, when the torque fluctuation ΔT1 is larger than the first allowable torque fluctuation TTA1, combustion is unstable. The program therefore advances to step 505 where the combustion stabilizing control is executed by at least the ignition timing, ignition method, air-fuel ratio, in-cylinder gas flow velocity, or EGR rate. The ignition timing, EGR rate, and air-fuel ratio are added to the process in step 504 to enhance combustion. In step 506, whether the torque fluctuation ΔT2 during execution of the combustion stabilizing control is larger than the second allowable torque fluctuation TTA2 is determined.

When the torque fluctuation ΔT2 during execution of the combustion stabilizing control is smaller than the second allowable torque fluctuation TTA2, it is determined that combustion is stabilized, and the program is finished. On the other hand, when the torque fluctuation ΔT2 during execution of the combustion stabilizing control is larger than the second allowable torque fluctuation TTA2, combustion is not improved. The program advances to step 507 where, as a last means of stabilizing combustion, the air-fuel ratio is corrected to rich and the ignition timing is advanced. The program is then finished.

Figure 24:
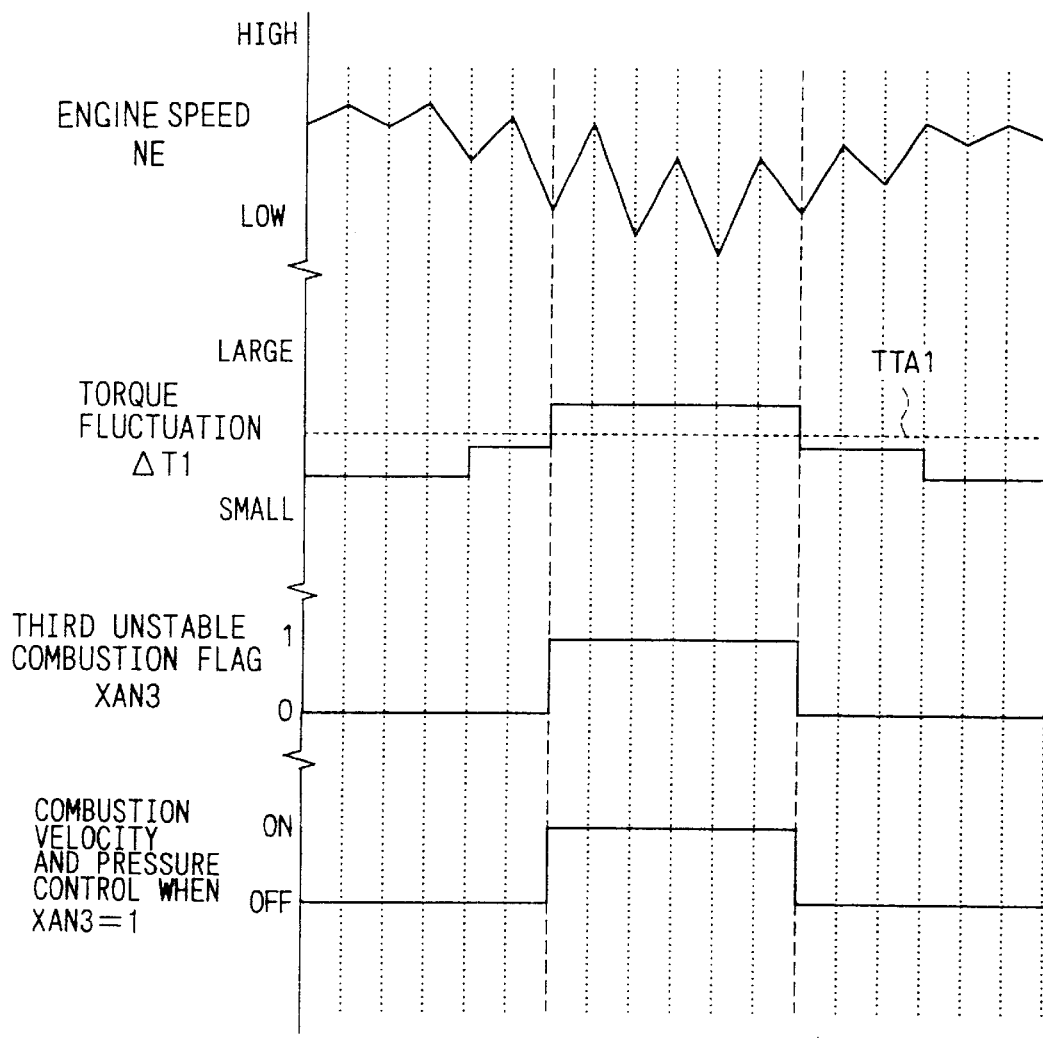
FIG. 24 is a time chart showing a control performed when a combustion state becomes unstable according to the present invention.

An example of the control when executing the above-described programs will be described with reference to the time charts of FIGS. 24 and 25. FIG. 24 shows an example of a control performed when combustion becomes unstable during engine operation. When combustion becomes unstable and the torque fluctuation ΔT1 becomes larger than the first allowable torque fluctuation TTA1, the third unstable combustion flag XAN3 is set to "1". In association, the combustion velocity and combustion pressure control performed when XAN3=1 (during decelerating operation or when combustion is unstable) is started. Consequently, during engine operation, the combustion velocity and the combustion pressure are improved each time combustion becomes unstable, thereby enabling combustion to be stabilized. Thus, stable drivability can be assured.

Figure 25:
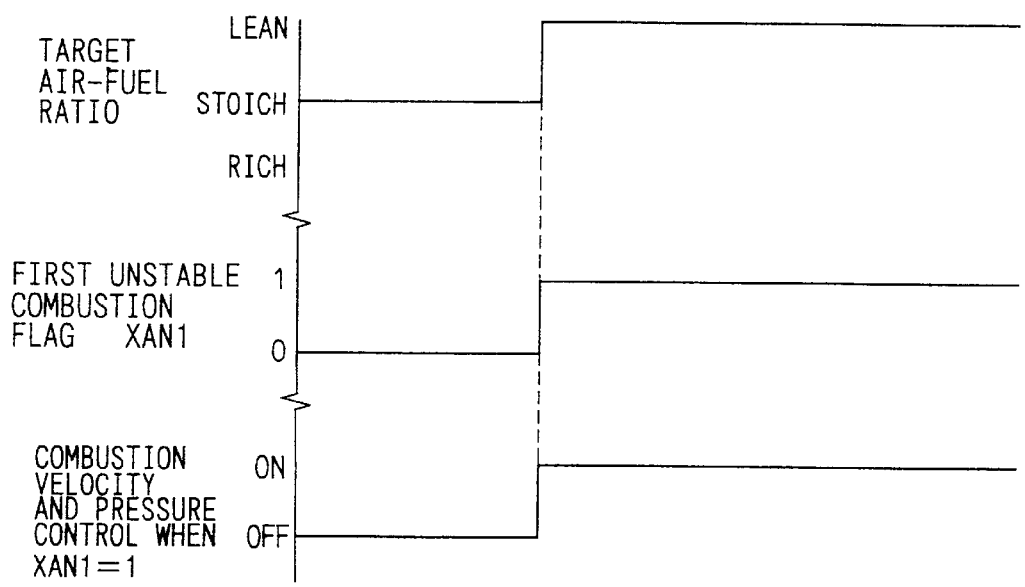
FIG. 25 is a time chart showing a control performed when a fuel stability deteriorating operation executing condition is satisfied according to the present invention.

FIG. 25 shows an example of the control performed when lean-burn operation (combustion stability deteriorating operation) is executed. When the lean-burn operation executing condition is satisfied (XAN1=1), the target air-fuel ratio is accordingly changed to lean. Simultaneously, the combustion velocity and combustion pressure control performed when XAN1=1 (during the lean-burn operation or idle speed decreasing control) is started. Consequently, deterioration in stability of combustion during the lean-burn operation is predicted and the combustion stabilizing control can be executed. An adverse influence on combustion by the lean-burn operation can be minimized and the stable combustion state can be maintained.

As described above, in the embodiment, during engine operation, when combustion becomes unstable or when the combustion stability deteriorating operation is executed, the combustion stabilizing control is executed. Thus, combustion can be always stabilized under various operating conditions, and always stable drivability can be assured.

Figure 5:
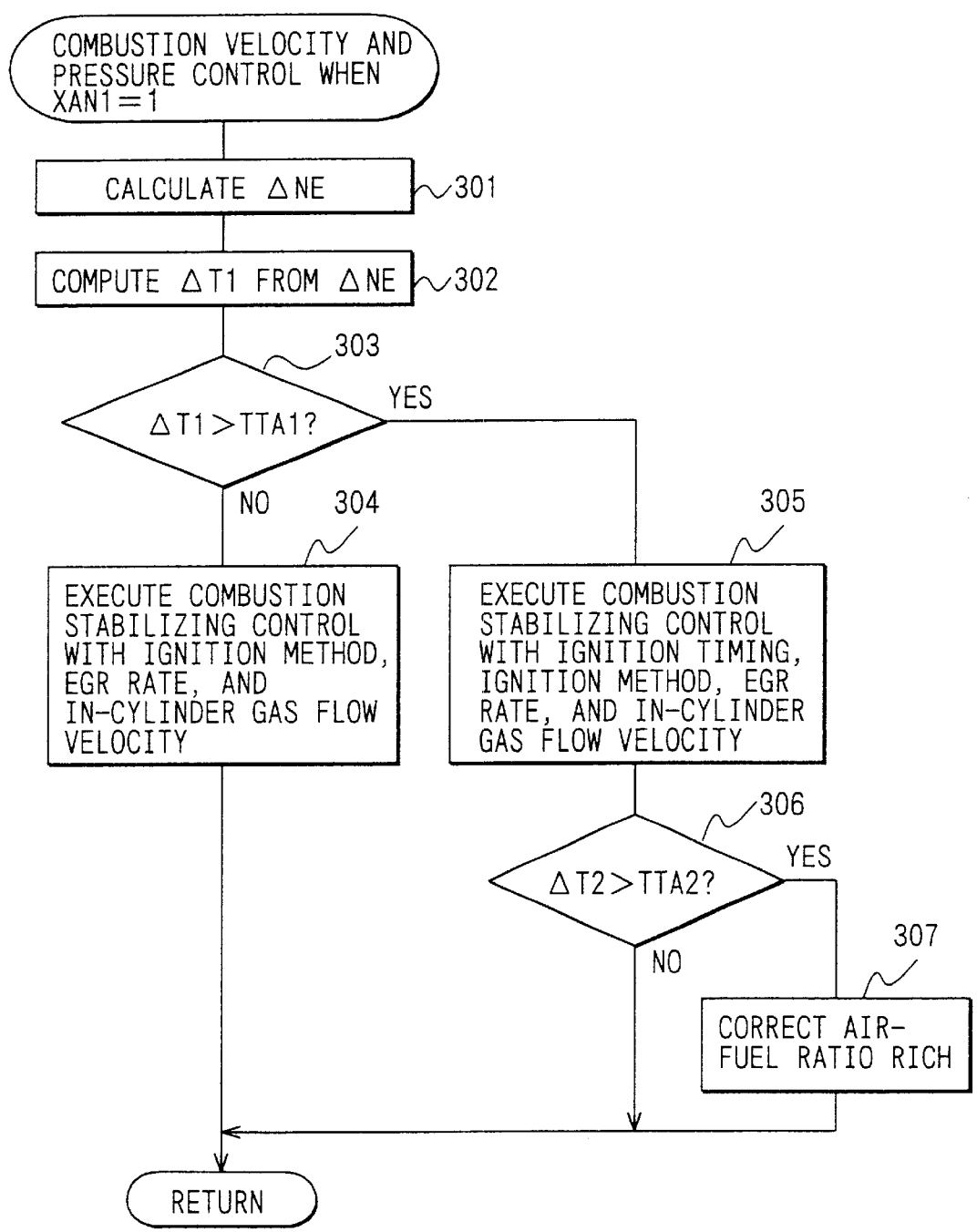
FIG. 5 is a flowchart showing the process of a combustion velocity and combustion pressure control program according to the present invention.

In the invention, the processes in step 304 in FIG. 5, step 404 in FIG. 6, and step 504 in FIG. 7 may be omitted and, only when combustion becomes unstable (when the torque fluctuation ΔT1 is larger than the first allowable torque fluctuation TTA1), the combustion stabilizing control may be executed.

In the embodiment, the control item in the combustion stabilizing control can be selected from the ignition timing, ignition method, in-cylinder gas flow velocity, EGR rate, and air-fuel ratio, and the control item which does not exert much influence on the engine control state at that time is selected according to the specific set unstable combustion flag (XAN1 to XAN3). Therefore, while achieving the engine control target, the combustion velocity and the combustion pressure are controlled, thereby enabling combustion to be stabilized.

Further, in the embodiment, depending on whether the torque fluctuation ΔT1 is larger than the first allowable torque fluctuation TTA1, the control item of the combustion stabilizing control is changed. Consequently, the combustion stabilizing control can be performed at a proper degree according to the degree of the unstableness of combustion.

In the embodiment, when performing multiple ignition, the target number of ignition times, target ignition time, and target ignition interval are obtained from the maps according to the engine operating parameters such as the engine speed NE, revolution speed fluctuation ΔNE, ignition timing, ignition retard amount, target air-fuel ratio, target exhaust temperature, in-cylinder gas flow velocity, swirl ratio, and EGR rate. Thus, the number of ignition times necessary to stabilize combustion can be assured with the minimum amount of energy according to the engine operating state at that time, and exhaustion of the electrode in the spark plug 31 and the load on the ignition device (ignition coil 32 and igniter 33) can be lessened.

Although multiple ignition, making a plurality of sparks during a single combustion stroke is performed by the single spark plug 31 during executing the combustion stabilizing control in the embodiment, it is also possible to dispose a plurality of spark plugs in a cylinder and make a spark at a plurality of positions during a single combustion stroke.

In the embodiment, combustion is detected in every cylinder and the combustion stabilizing control is executed. Consequently, even when combustion varies among cylinders due to variations in charging efficiency of the cylinders, the optimum combustion stabilizing control can be executed for each cylinder. Thus, accuracy of the combustion stabilizing control can be improved.

It is, however, not always necessary to detect combustion every cylinder. It is also possible to detect combustion of a specific representative cylinder, detect an average combustion state of the whole engine, or sequentially switch cylinders to detect combustion.

In the embodiment, combustion is detected from the revolution speed fluctuation ΔNE (torque fluctuation ΔT1). Consequently, sensors such as a combustion (optical) sensor and an in-cylinder pressure sensor are unnecessary and there is an advantage that the cost can be reduced. It is, however, also possible to directly detect combustion by a combustion (optical) sensor, an in-cylinder pressure sensor, and the like. Here as well, the intended object of the invention can be sufficiently achieved. It is also possible to detect ions in a combustion gas in a cylinder during combustion via a spark plug and detect combustion from an ion current.

Although a swirl flow is generated in a cylinder by the swirl control valve 30 to control the in-cylinder gas flow velocity, by stopping one of the two intake valves 27, a swirl flow may be generated in a cylinder. In a system having a tumble flow control mechanism for controlling the strength of the tumble flow in a cylinder, the in-cylinder gas flow velocity may be controlled by controlling the tumble flow strength in a cylinder.

In the embodiment, when one of the lean-burn operation, exhaust temperature increasing control, idle speed decreasing control, or decelerating operation is performed, the combustion stabilizing control is executed. However, a part of the conditions may be eliminated or other conditions (such as execution of scavenging logic after turn-off of the ignition switch) may be added. The scavenging logic after turn-off of the ignition switch burns fuel injected just before turning off the ignition switch by igniting the fuel after turn-off. When the combustion stabilizing control is executed during execution of the scavenging logic, the ignition performance during execution of the scavenging logic can be improved.

The invention is not limited to an intake port injection engine as in the foregoing embodiment but can be also applied to a direct injection engines and lean-burn engines. The invention can be variously modified.

While the above-described embodiments refer to examples of usage of the present invention, it is understood that the present invention may be applied to other usage, modifications and variations of the same, and is not limited to the disclosure provided herein.

What is claimed is:

1. A controller for an internal combustion engine, comprising:

combustion state detecting means for detecting a combustion state of an internal combustion engine; and combustion stabilizing control means for executing a combustion stabilizing control which controls at least the combustion velocity or combustion pressure to stabilize combustion when combustion detected by combustion detecting means is unstable.

2. A controller for an internal combustion engine according to claim 1, wherein the combustion stabilizing control means stabilizes combustion by controlling at least an ignition timing, ignition method, air-fuel ratio, in-cylinder gas flow velocity, exhaust circulating amount, or valve overlap amount of an intake valve and an exhaust valve during the combustion stabilizing control.

3. A controller for an internal combustion engine according to claim 2, further comprising ignition means executing ignition a plurality of times or ignition in a plurality of positions in each cylinder during a single combustion stroke;

wherein the combustion stabilizing control means switches at least the number of ignition times or the number of ignition places in a single combustion stroke when an ignition method is switched.

4. A controller for an internal combustion engine according to claim 3, wherein the combustion stabilizing control means switches the number of ignition times in a single combustion stroke based on at least in-cylinder gas flow velocity, air-fuel ratio, exhaust circulating amount, in-cylinder pressure, or cooling water temperature when the ignition method is switched.

5. A controller for an internal combustion engine according to claim 3, wherein the combustion stabilizing control means changes ignition time or ignition interval when performing ignition a plurality of times during a single combustion stroke based on at least an in-cylinder gas flow velocity, air-fuel ratio, exhaust circulating amount, in-cylinder pressure, or cooling water temperature.

6. A controller for an internal combustion engine according to claim 2, further comprising in-cylinder flow control means for controlling swirl flow strength or tumble flow strength in a cylinder; and wherein the combustion stabilizing control means controls in-cylinder gas flow velocity with the in-cylinder flow control means.

7. A controller for an internal combustion engine according to any claim 1, wherein the combustion stabilizing control means executes the combustion stabilizing control when operating under an operating condition which deteriorates combustion stability.

8. A controller for an internal combustion engine according to claim 7, wherein the operating condition which deteriorates combustion stability is at least s lean-burn operation, exhaust temperature increasing control, idle speed decreasing control, decelerating operation, or execution of a scavenging logic after turn-off of an ignition switch.

9. A controller for an internal combustion engine according to claim 7, wherein the combustion stabilizing control means changes a control item of the combustion stabilizing control according to a specific operating condition which deteriorates combustion stability.

10. A controller for an internal combustion engine according to any one of claims 1 to 9, wherein the combustion stabilizing control means changes a control item of the combustion stabilizing control according to the degree of unstableness of combustion.

11. A controller for an internal combustion engine according to claim 1, wherein the combustion detecting means detects combustion in each cylinder.

* * * * *